(12) United States Patent
Rohrer

(10) Patent No.: US 10,647,391 B2
(45) Date of Patent: May 12, 2020

(54) MOUNTING APPARATUS AND RELATED METHODS OF FABRICATING OR RETROFITTING A SURFBOARD WITH SAID MOUNTING APPARATUS

(71) Applicant: Byron Rohrer, San Diego, CA (US)

(72) Inventor: Byron Rohrer, San Diego, CA (US)

(*) Notice: Subject to any disclaimer, the term of this patent is extended or adjusted under 35 U.S.C. 154(b) by 0 days.

(21) Appl. No.: 15/967,399

(22) Filed: Apr. 30, 2018

(65) Prior Publication Data

US 2019/0002063 A1 Jan. 3, 2019

Related U.S. Application Data

(63) Continuation-in-part of application No. 15/799,308, filed on Oct. 31, 2017, now Pat. No. 10,308,329.

(60) Provisional application No. 62/415,442, filed on Oct. 31, 2016.

(51) Int. Cl.
| | | |
|---|---|---|
| *B63B 9/00* | (2006.01) | |
| *G03B 29/00* | (2006.01) | |
| *B63B 35/79* | (2006.01) | |
| *B63B 35/85* | (2006.01) | |
| *G03B 17/56* | (2006.01) | |

(52) U.S. Cl.
CPC ............ *B63B 35/7906* (2013.01); *B63B 9/00* (2013.01); *B63B 35/79* (2013.01); *B63B 35/793* (2013.01); *B63B 35/85* (2013.01); *G03B 17/561* (2013.01); *G03B 29/00* (2013.01)

(58) Field of Classification Search
CPC ..... B63B 35/79; B63B 35/85; B63B 35/7906; B63B 35/7936; B63B 9/00

USPC .......................................................... 396/419
See application file for complete search history.

(56) References Cited

U.S. PATENT DOCUMENTS

| | | | |
|---|---|---|---|
| 4,592,734 A | 6/1986 | Metiver | |
| 5,460,558 A | 10/1995 | Woodstock | |
| 5,484,312 A | 1/1996 | Zepeda | |
| 5,544,919 A | 8/1996 | Tinkler | |
| 5,591,060 A | 1/1997 | Forsyth | |
| 6,035,799 A * | 3/2000 | Lukanovich | B63B 35/71 |
| | | | 114/343 |
| 8,150,248 B1 | 4/2012 | Woodman | |
| 8,672,719 B2 * | 3/2014 | Grimes | B63B 35/73 |
| | | | 114/364 |
| 2007/0032149 A1* | 2/2007 | Sebba | A63C 10/04 |
| | | | 441/74 |
| 2010/0061711 A1 | 3/2010 | Woodman | |
| 2011/0294381 A1* | 12/2011 | Nazzari | B63B 35/7933 |
| | | | 441/74 |

FOREIGN PATENT DOCUMENTS

WO WO2016/054690 4/2016

* cited by examiner

*Primary Examiner* — Clayton E. LaBalle
*Assistant Examiner* — Linda B Smith
(74) *Attorney, Agent, or Firm* — Buche & Associates, P.C.; John K. Buche; Bryce A. Johnson

(57) ABSTRACT

Disclosed is a mount for attaching objects, like cameras and bindings to the surfaces of a surfboard. Further disclosed is related methods of fabricating or retrofitting a surfboard with said mount. The more specific details of the disclosed mount and related methods are described in connection with the figures.

6 Claims, 27 Drawing Sheets

PLAN VIEW scale 1:1

PLAN VIEW scale 2:1

MOUNTING APPARATUS AND RELATED METHODS OF FABRICATING OR RETROFITTING A SURFBOARD WITH SAID MOUNTING APPARATUS

CROSS-REFERENCE TO RELATED APPLICATIONS

This application is a continuation-in-part of U.S. patent application Ser. No. 15/799,308 (filed Oct. 31, 2017). U.S. patent application Ser. No. 15/799,308 claims the benefit and priority of U.S. Prov. App. Ser. No. 62/415,442 (filed Oct. 31, 2016). Both of the above referenced documents are hereby incorporated by reference in their entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND AN INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Field of Invention

The disclosed subject matter is in the field of mounting apparatuses for surfboard or other floating objects. The disclosed subject matter is also in the related fields of fabricating or retrofitting surfboards or other floating objects with mounting apparatuses.

Background of the Invention

Surfboards are elongated floating platforms used in the sport of surfing. A basic surfboard 1000, shown in FIG. 1, is essentially a hydrodynamically shaped plank. The topside 1100 of the plank is known colloquially as the deck. The underside 1200 of the plank is known as the bottom. The front 1300 and back 1400 of the plank are respectively dubbed the nose and tail. Finally the left side 1500 and right side 1600 of the plank are known as the rails. Some surfboards 1000 have fins 1700 that extend from the bottom 1200 of the board 1000 adjacent to its tail 1400. Modern surfboards are made of polyurethane or polystyrene foam covered with layers of fiberglass cloth and polyester or epoxy resin. In use, a surfer rides on the deck of the surfboard while the board moves along the forward face (also known as the deep face) of a moving wave.

With the advent of waterproof and handheld cameras, surfers have carried cameras during a surf session so that the activity can be recorded in moving pictures with a close-up or point-of-view camera angle. Handheld cameras can be problematic when a surfer needs both hands while surfing. So, a need exists for hand-free operation of cameras during surf sessions. Mouthpiece camera mounts for surfer operation of cameras during a surf session are known. Cameras can also be mounted to a surface of the surfboard, but mounts have not yet been ideal because surfboards are preferably streamlined and seamless to ensure that the plank is as hydrodynamic as possible.

SUMMARY OF THE INVENTION

In view of the foregoing, an object of this invention is to disclose mounting apparatus for mounting cameras and other items to surfboard or other floating objects. The disclosed subject matter is also in the related fields of fabricating or retrofitting surfboards or other floating objects with such mounting apparatus. In one embodiment, the mounting apparatus is defined by a base with a socket. In a preferred mode of fabrication or retrofitting of a surfboard with a mount, a template or stencil of a mount's footprint is positioned between a router and a surfboard, a hole that is generally in the shape of said footprint is cut to a predetermined depth in the surface of the surfboard by the router, the mount is installed in said hole so that the socket is provided to the surface, and a camera mount, or mounting plate with a plug is provided to the mount wherein the plug and socket mate.

The disclosed mount could be provided to any surface according to the methods described. So, the mount could be installed on dash boards of vehicles, snow boards, countertops, or any other surface. In some embodiments, the mount could be installed on a helmet.

BRIEF DESCRIPTION OF THE SEVERAL VIEWS OF THE DRAWINGS

Other objectives of the disclosure will become apparent to those skilled in the art once the invention has been shown and described. The manner in which these objectives and other desirable characteristics can be obtained is explained in the following description and attached figures in which.

Figure 1:
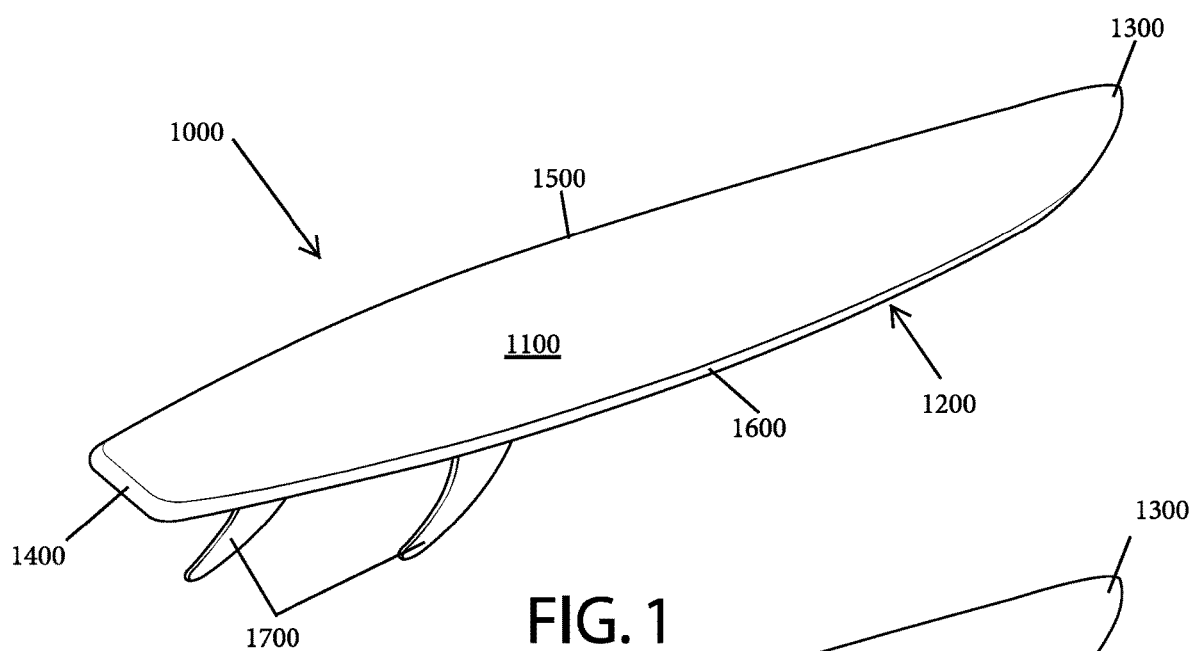
FIG. 1 is a perspective view of a surfboard 1000.

In the figures, the following items correspond to the associated reference numeral in the drawings:

surfboard—1000
topside—1100
underside—1200
front—1300
back—1400
left side—1500
right side—1600
fins—1700
mount—1800
base—1810
set hole—1811
socket—1820
base hole—1830
mounting plate—1900
mount surface—1910
plug—1920
connector—1930
coupling—1940
template—2000
router guide—2100
pole—3000
pole attachment—3100
dual attachment—3200
camera mount—3300
mounting clamp—3400
undersurface area—3500
mounting base—3600
spring clip—3700
connecting rod—3800
camera—4000
foothold—5000
foot hold structure—5100
securement opening—5110
securing piece alley—5120
foot hold platform—5130
foot hold anchor—5200
foot hold securing piece—5210
foot hold flag piece—5220
foot hold hood—5300
hood opening—5310.

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Disclosed is a mount for attaching objects, like cameras and bindings to the surfaces of a surfboard. Further disclosed are related methods of fabricating or retrofitting a surfboard with said mount. The more specific details of the disclosed mount and related methods are described in connection with the figures.

Figure 2:
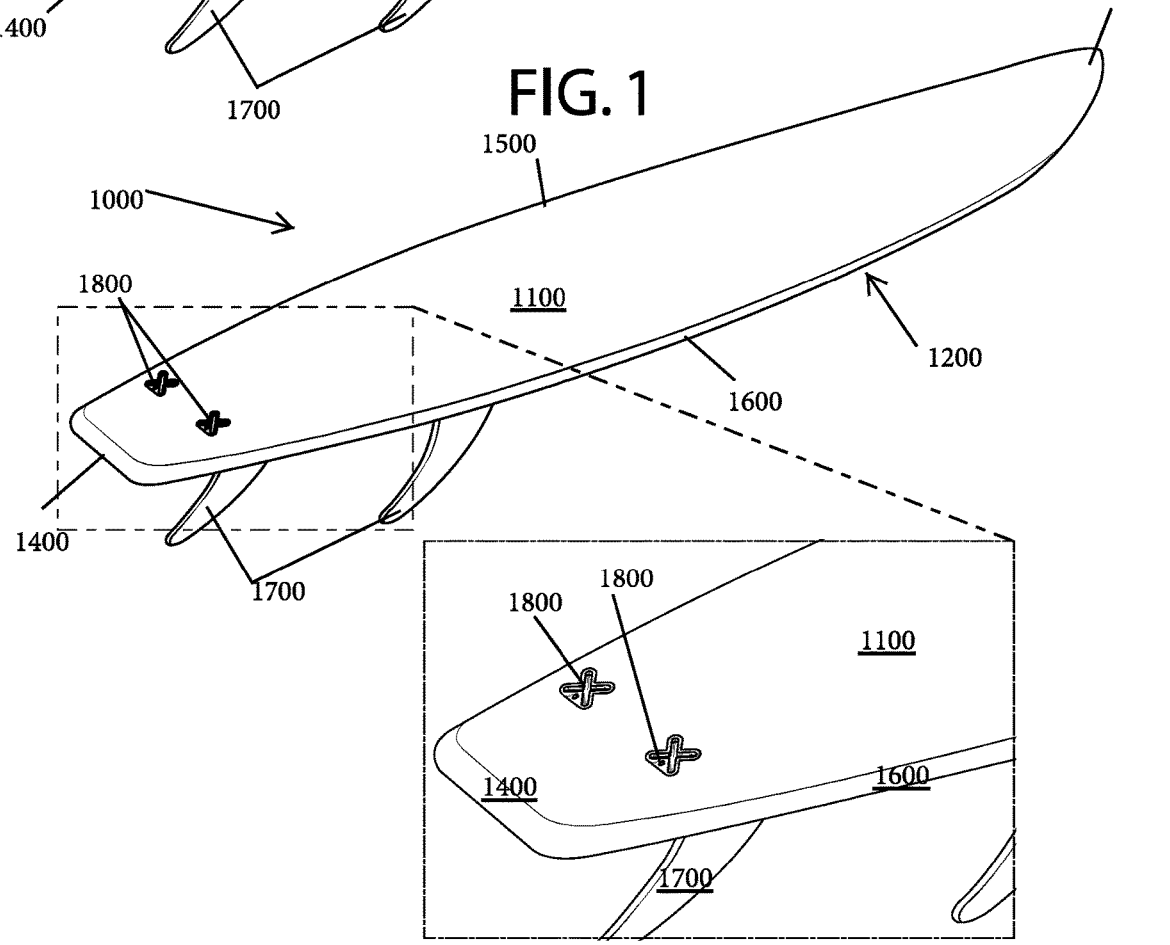
FIG. 2 is a perspective view and zoom-in view of an improved surfboard 1000.

FIG. 1 is a perspective view of a surfboard 1000. As shown, the surfboard 1000 generally features a deck 1100, a bottom 1200, a nose 1300, a tail 1400, a left side rail 1500, a right side rail 1600, and fins 1700. FIG. 2 is a perspective view and zoom-in view of an improved surfboard 1000, where mounts 1800 have been installed flush with the deck 1100 of the surfboard 1000 of FIG. 1.

Figure 3:
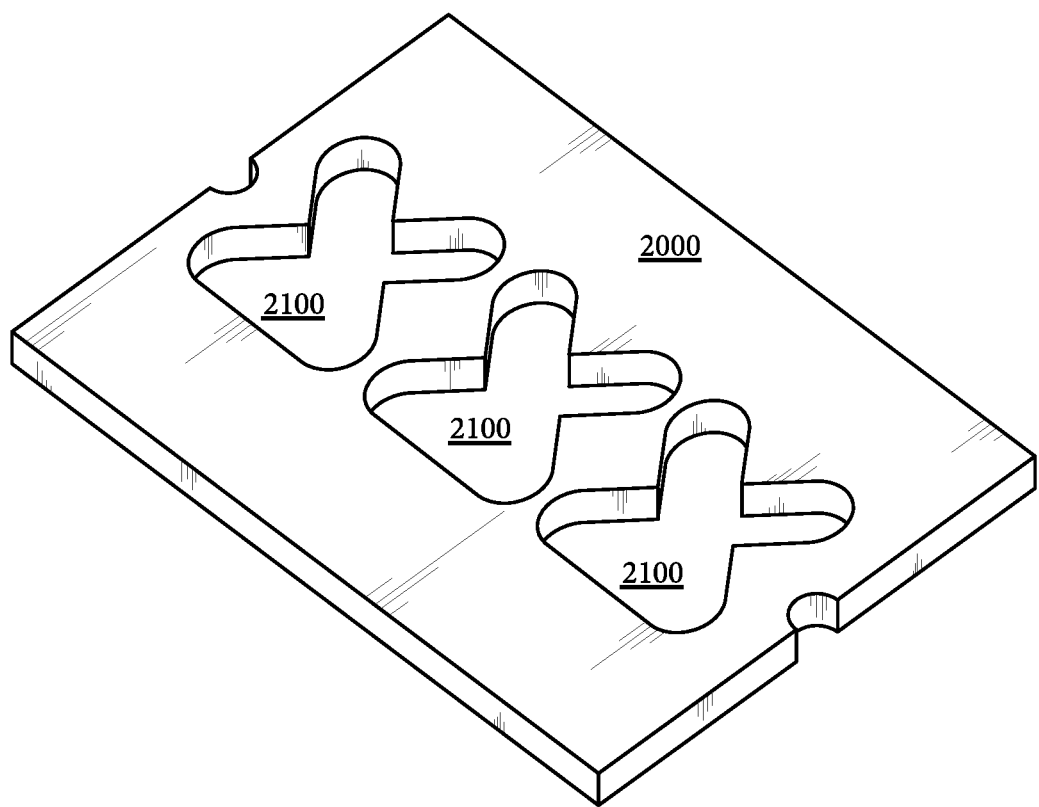
FIG. 3 is a perspective view of a template 2000.
Figure 3A:
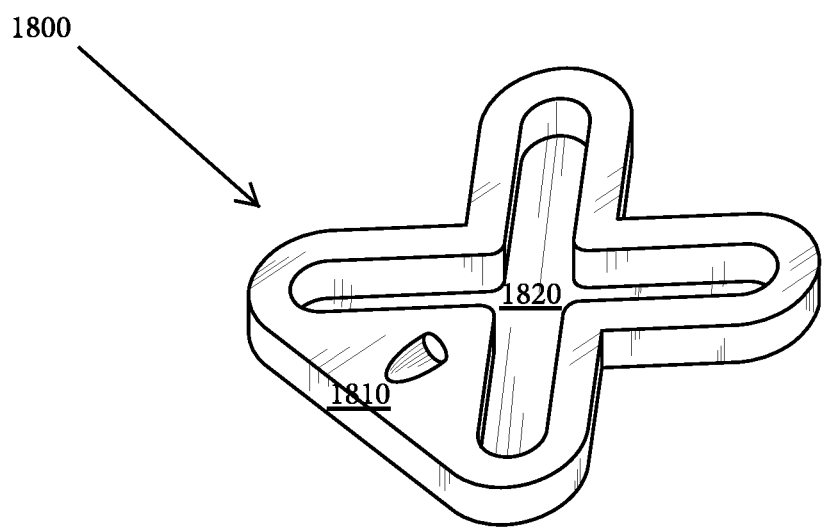
FIG. 3A is a perspective view of a mount 1800.

FIG. 3 is a perspective view of a template 2000. FIG. 3A is a perspective view of a mount 1800 (that could also be considered a receiver), where the mount is defined by a base 1810 a socket 1820 or receptacle. The template 2000 features cut-outs, including at least one cut out, that define router-guides 2100 that are the same size and shape as the footprint of the base 1810 of the mount 1800. Suitably, the template 2000 and mount may be constructed of plastics and, in a preferred embodiment, manufactured by a 3-D printer.

Figure 4:
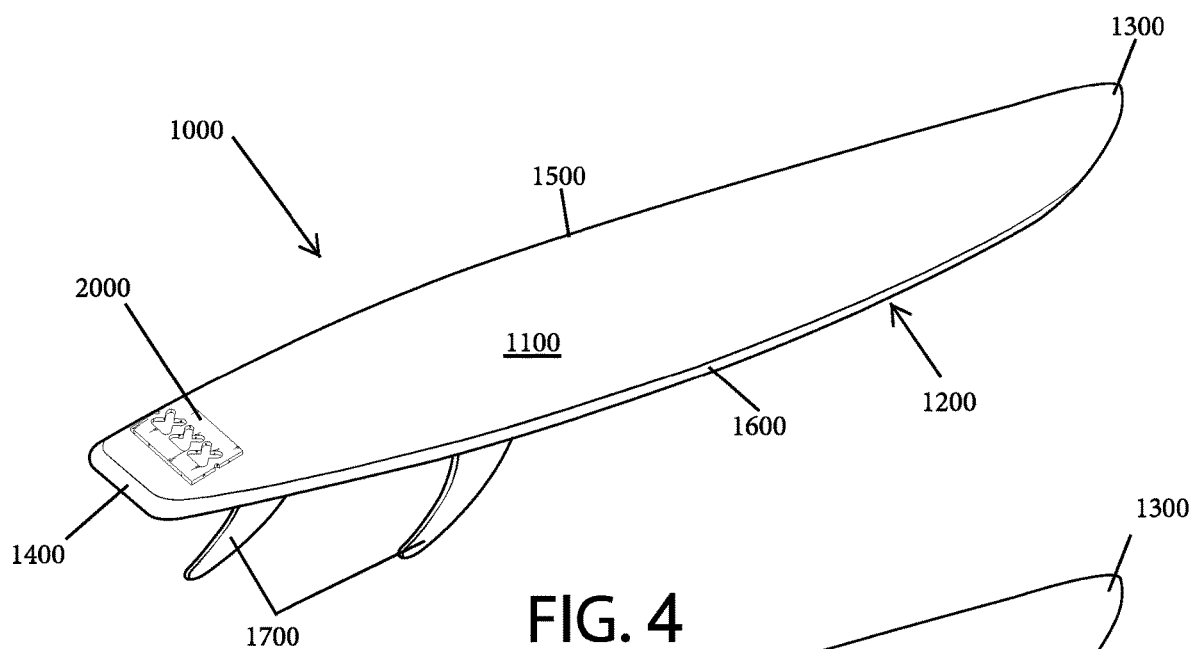
FIG. 4 is an environmental perspective view of a surfboard 1000 and template 2000.
Figure 5:
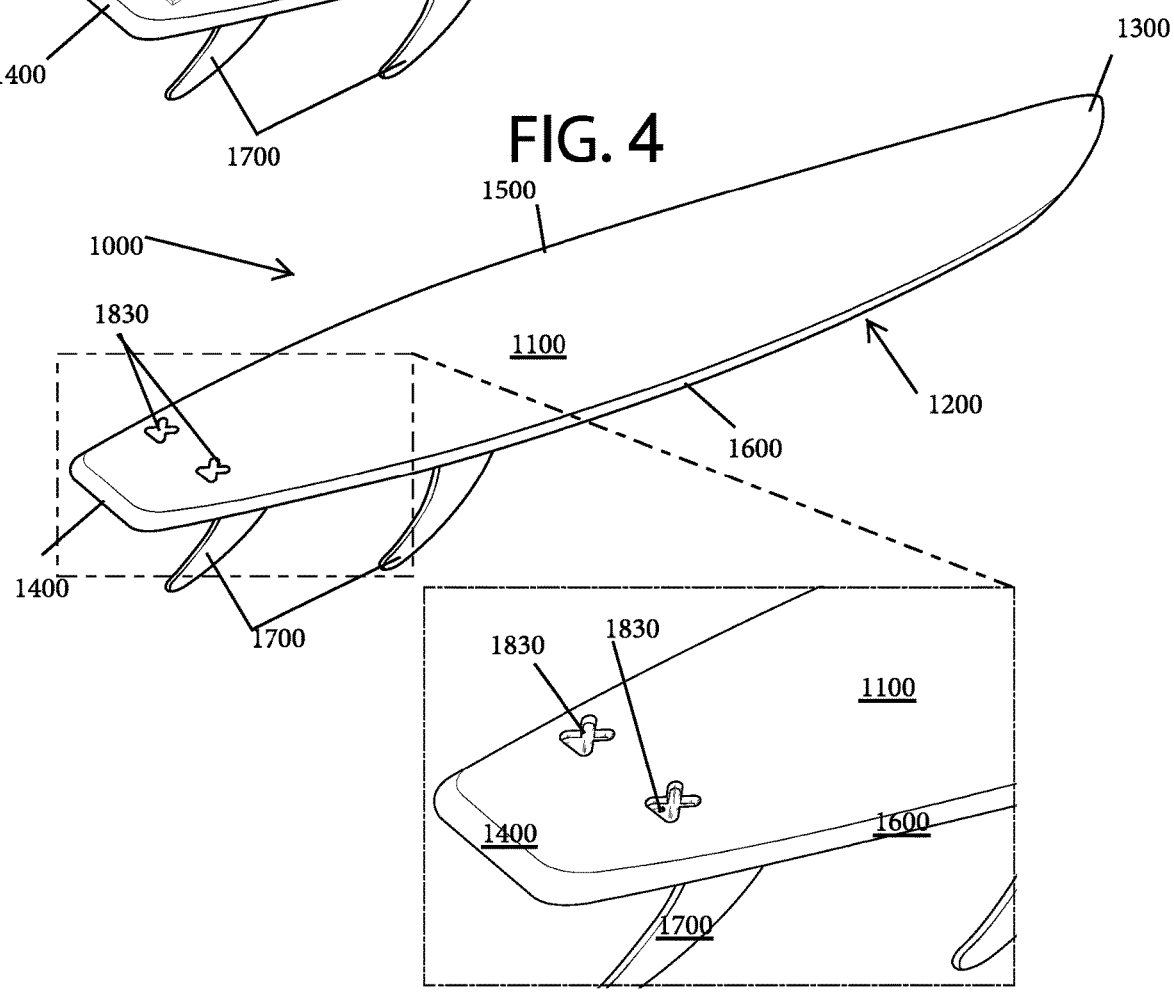
FIG. 5 is an environmental perspective view and zoom-in view of an improved surfboard 1000 with base hole 1830.

FIG. 4 an environmental perspective view of a surfboard 1000 and template 2000. FIG. 5 is an environmental perspective view and zoom-in view of an improved surfboard 1000 with base hole 1830. Suitably, the template 2000 may be disposed on a surface, e.g. the surface of the deck 1100 of a surfboard 1000 to act as a stencil for cutting a base hole 1830 (FIG. 5) via a router into the underlying surface 1100 of the surfboard 1000 to a predefined depth (the depth of the mount 1800) so that a mount 1800 may be placed into the hole 1830 and installed flush with said underlying surface (see FIG. 2). Suitably, if the base hole 1830 results in the misalignment of the mount 1800 and the surface 1100, the mount may be sanded or filled so that the surface and mount 1800 are flush. Suitably, the mount 1800 may be installed on any surface and at any point of the surfboard 1000 and any positions of the mount 1800 illustrated in the figures are preferred and illustrative of positioning of the mount at any point.

As shown in the figures, the foot print of the base 1810 and corresponding hole 1830 are generally in the shape of an X or otherwise feature digits. While the footprint of the base 1810 and hole 1830 may be any shape, a digited shape, like an X or ½ X, Y, K, T, Q, A, V, Z, *, +, <, >, is preferred because, the hole 1830 cannot be established too deep within the surface of the surfboard 1000 without compromising the structural integrity of the board 1000. A digited footprint provides additional surfaces for interfacing of the base 1810 and the hole 1830 whereby a more sturdy connection between the base 1810 and surfboard can be had. Additionally, digited footprints, like and X or asterisk, can be more aesthetically pleasing than basic shapes.

Figure 6:
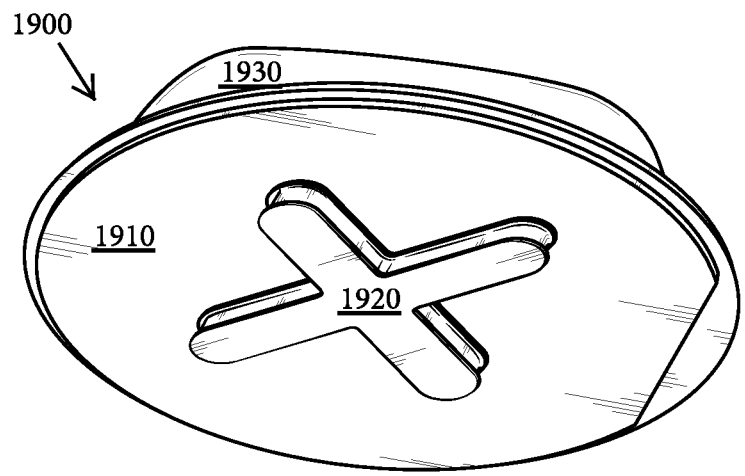
FIG. 6 is an underneath perspective of a mounting plate 1900 of a connector 1930.
Figure 7:
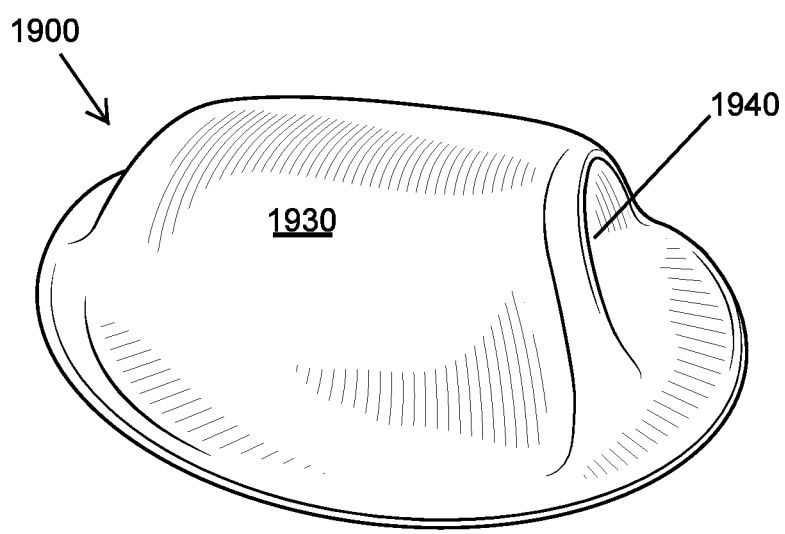
FIG. 7 is a top perspective of a mounting plate 1900 of a connector 1930.
Figure 8:
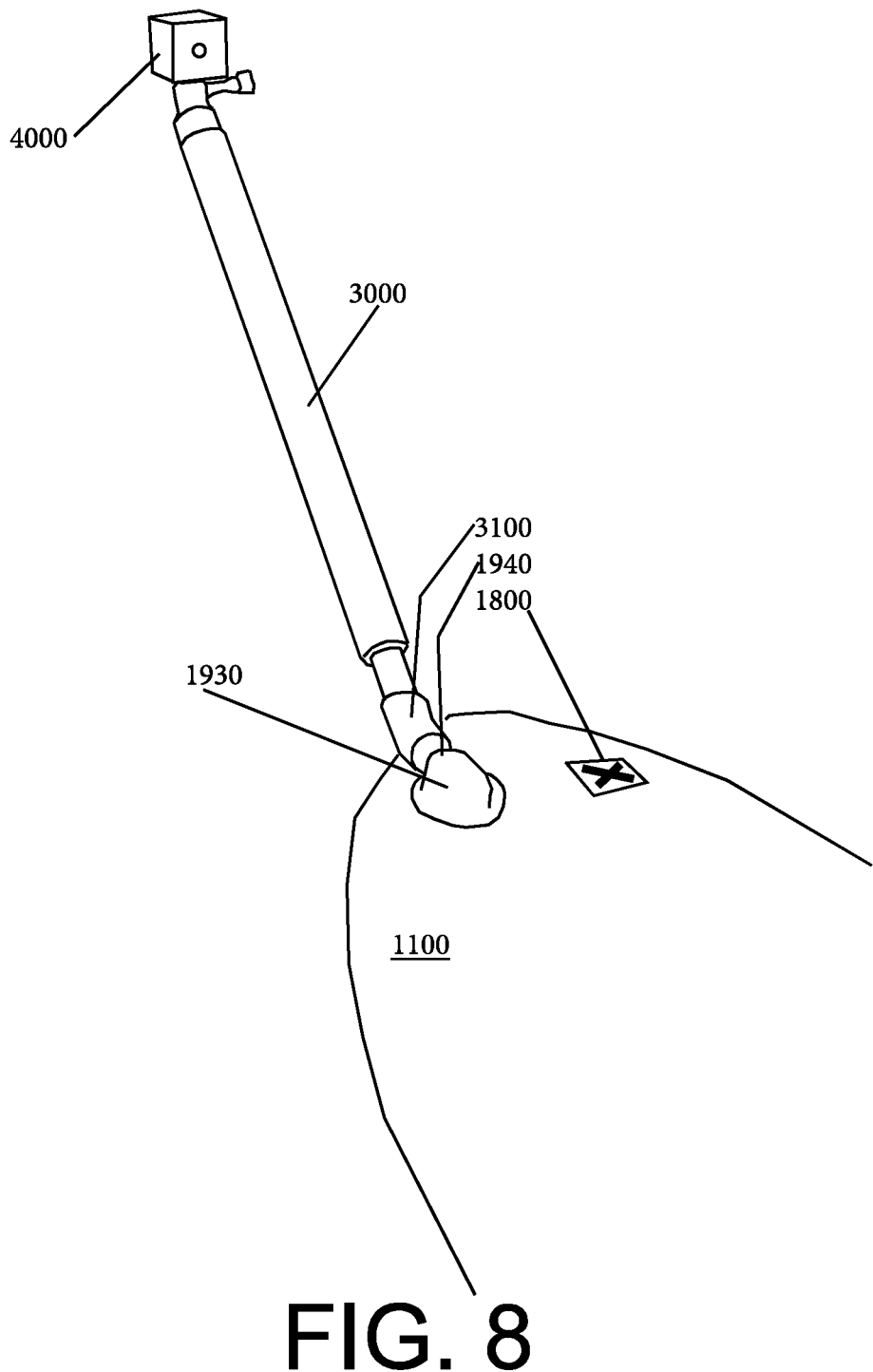
FIG. 8 is an environmental view of a camera 4000 mounted on a pole 3000 that is coupled to a connector 1930.
Figure 9:
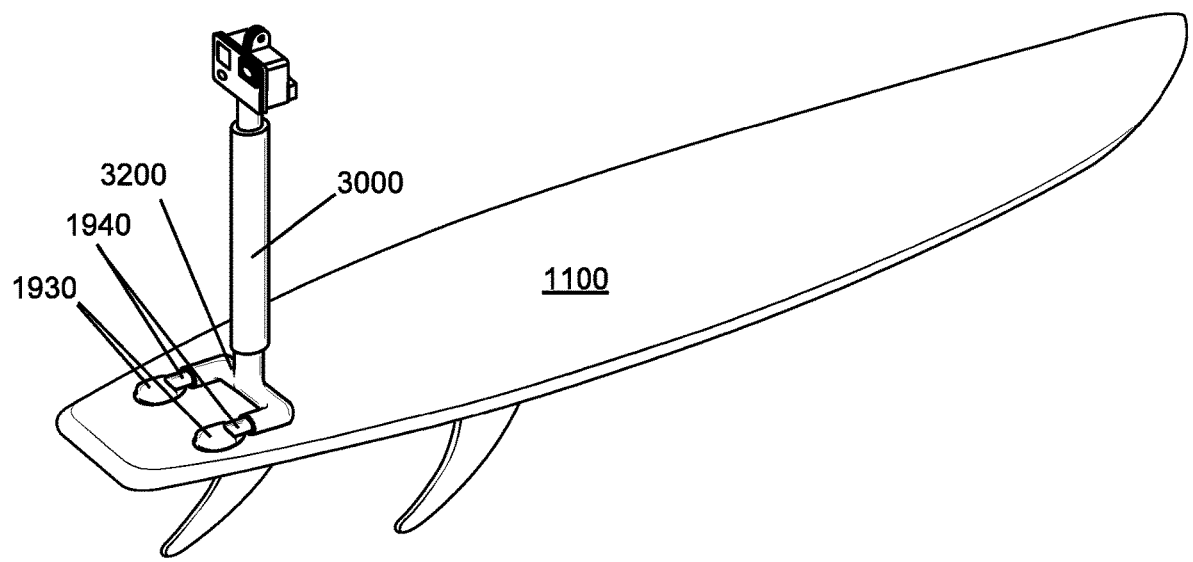
FIG. 9 is another environmental view of a camera 4000 mounted on a pole 3000 that is coupled to two connectors 1930.

FIG. 6 is an underneath perspective of a mounting plate 1900 of a connector 1930. FIG. 7 is a top perspective of a mounting plate 1900 of a connector 1930. FIG. 8 is an environmental view of a camera 4000 mounted on a pole 3000 that is coupled to a connector 1930. Suitably, a mounting plate 1900 features a plug 1920 that corresponds to the socket 1820 of a mount 1800 and a mount surface 1910 that corresponds to the surface 1100 of a surfboard 1000 so that the mounting plate 1900 may be coupled to the mount 1800 via cooperation of the plug 1920 and socket 1820. As shown in FIG. 3A, the base 1810 may have a set hole so that the plug 1920 and socket 1829 may be more fixedly secured. Ultimately, the mounting plate 1910 may accommodate a connector 1930 that can be used, for instance, to receive a pole 3000 of a camera 4000 via a receptacle 1940 and a pole connector 1930. FIG. 9 is another environmental view of a camera 4000 mounted on a pole 3000 that is coupled to two connectors 1930 instead of a single connector for added stability.

Figure 10:
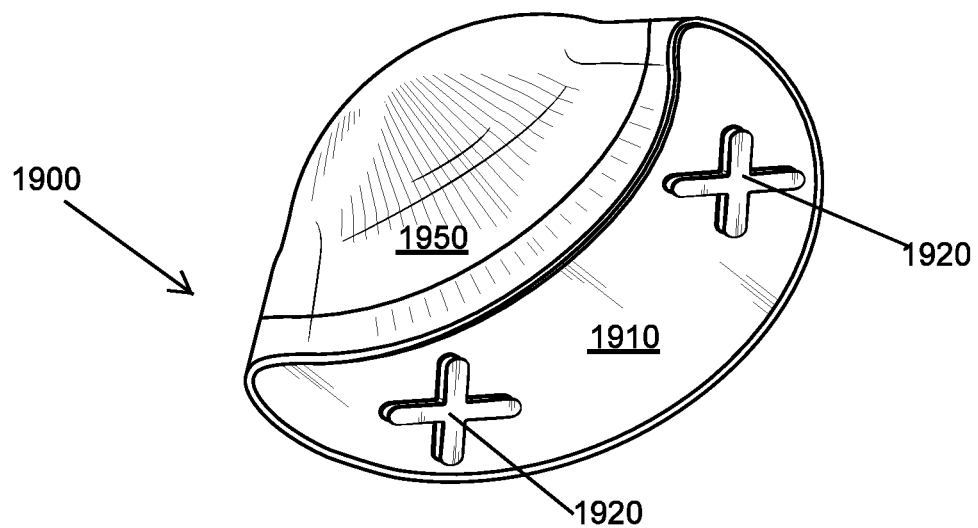
FIG. 10 is a is an underneath perspective view of a mounting plate 1900 of a binding 1950.
Figure 11:
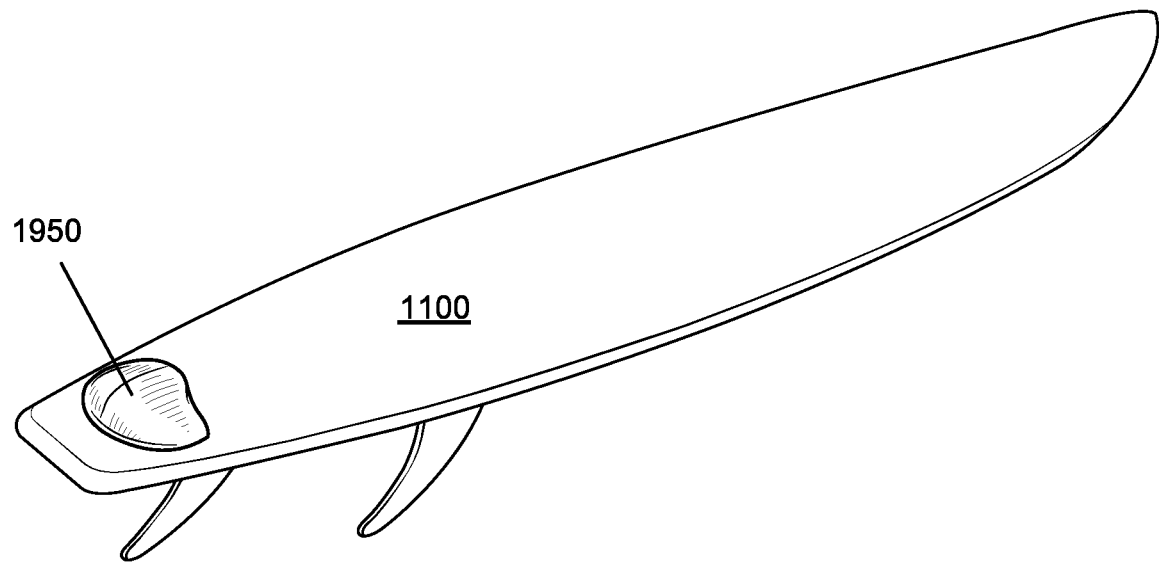
FIG. 11 is an environmental view of a surfboard 1000 that has a binding mounted on its deck 1100.
Figure 14:
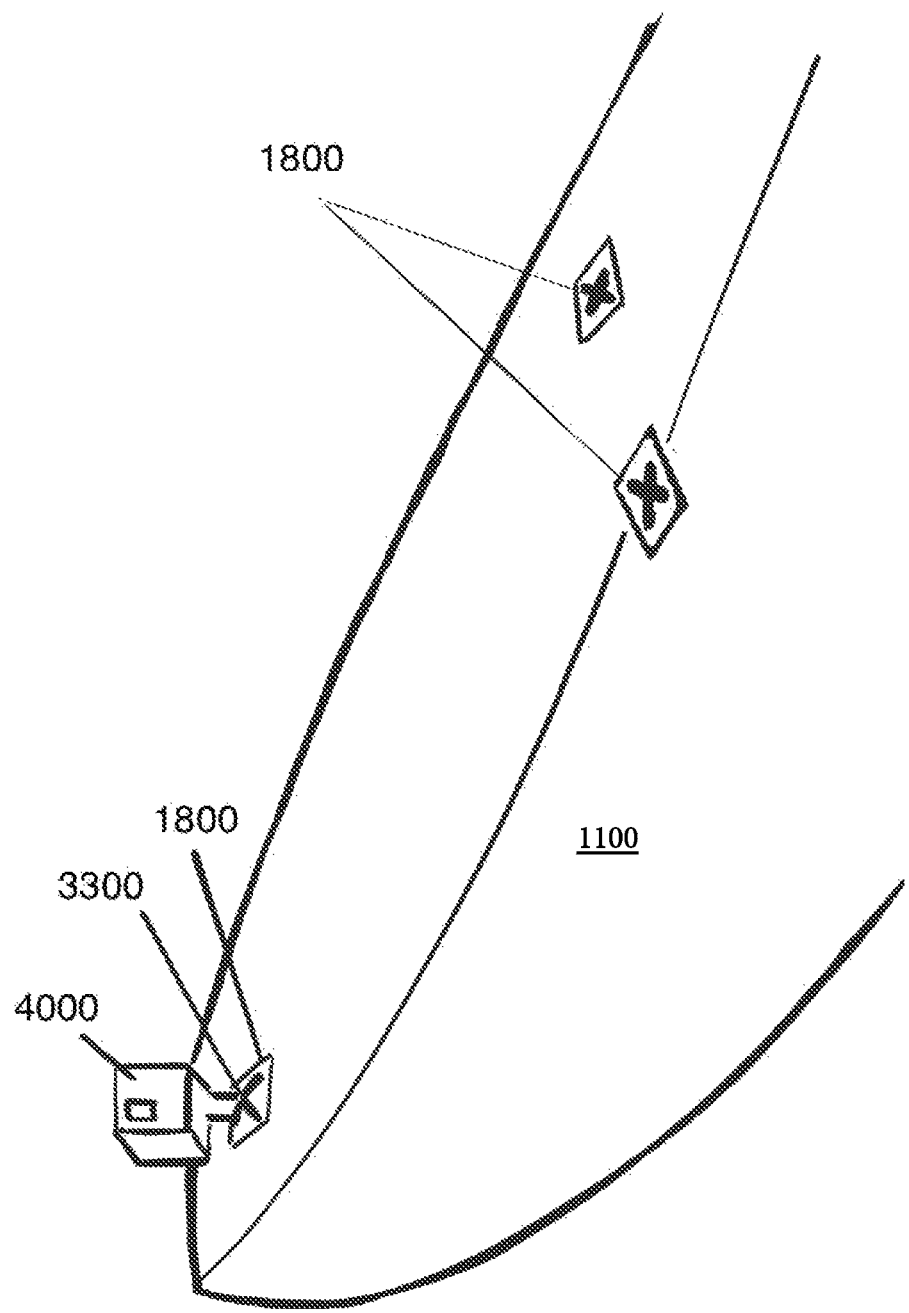
FIG. 14 is an alternative view of the surfboard 1000 of FIG. 14 with the binding removed.
Figure 15:
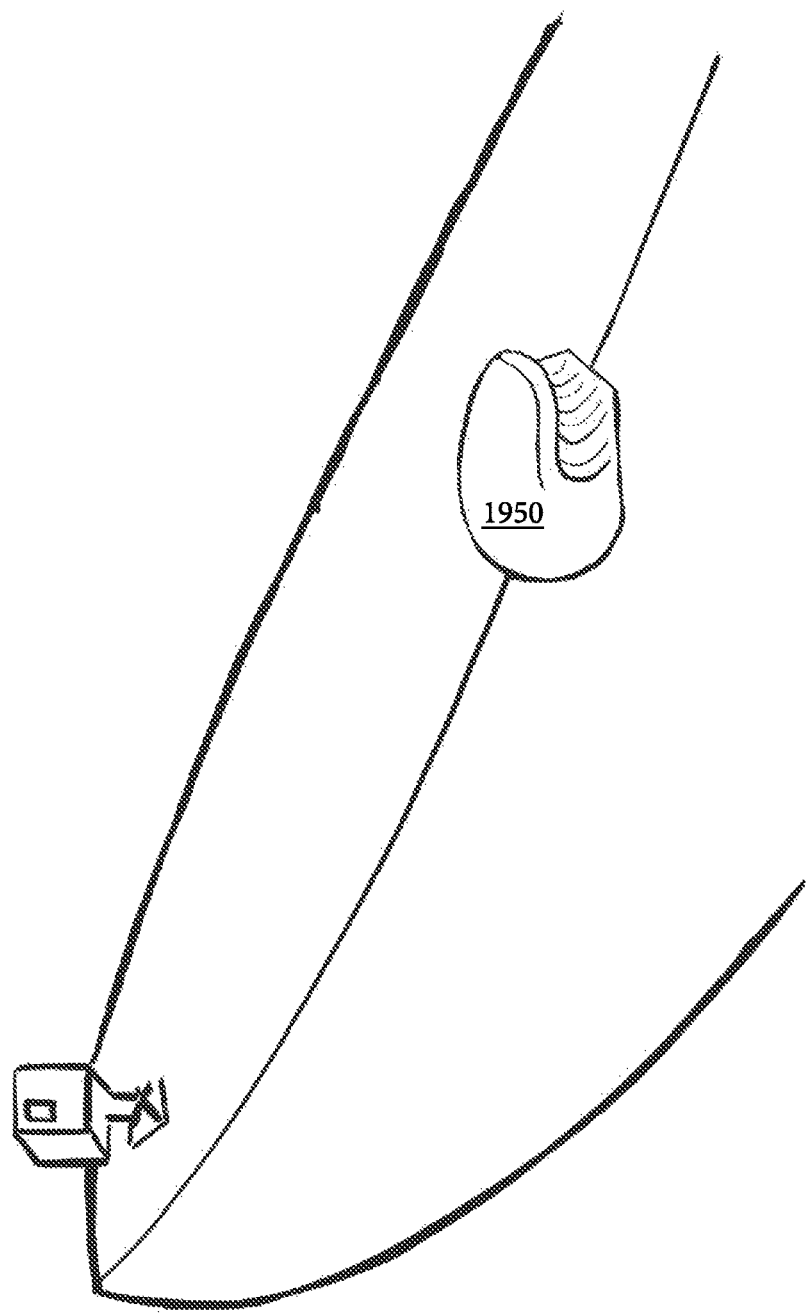
FIG. 15 is another environmental perspective view of a surfboard 1000 with a binding installed thereon the deck 1200 of the surfboard 1000.

FIG. 10 is an underneath perspective view of a mounting plate 1900 of a binding 1950. FIG. 11 is an environmental view of a surfboard 1000 that has a binding mounted on its deck 1100. FIG. 15 is another environmental perspective view of a surfboard 1000 with a binding 1950 installed thereon the deck 1200 of the surfboard 1000. FIG. 15 is an alternative view of the surfboard 1000 of FIG. 14 with the binding 1950 removed. Suitably, the binding 1950 features a mounting surface 1910 and two plugs 1920 for cooperation with the sockets 1820 of two mounts 1800 provided to the deck 1100 of the surfboard. Referring to FIG. 14, a standard Go-Pro® camera mount 3300 has been provided with a plug 1920 so that the mount 3300 may be mated to the socket 1820 of a mount 1800 provided to the surface of the surfboard.

Figure 12:
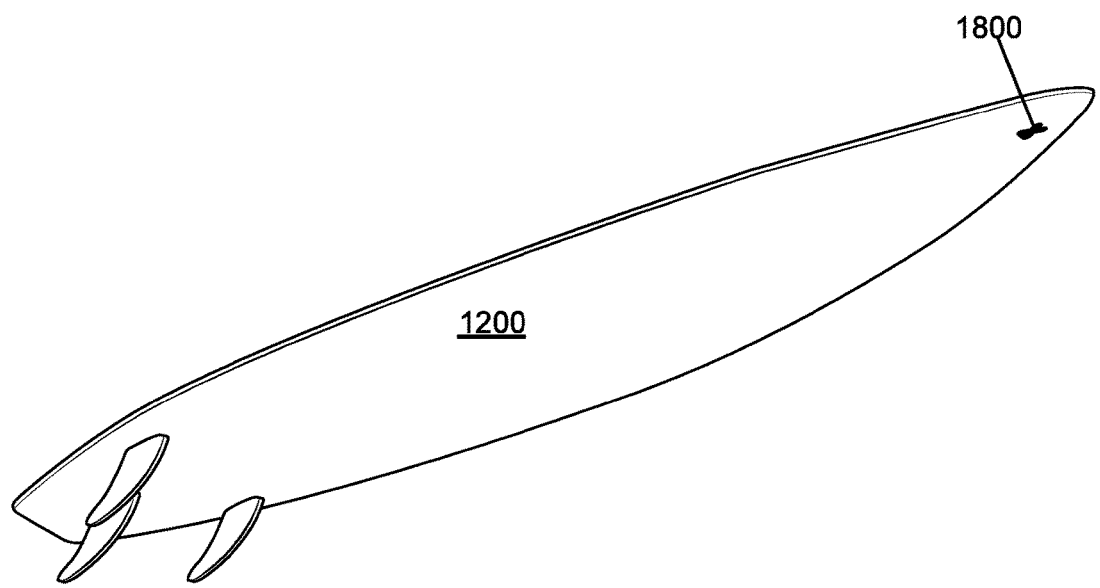
FIG. 12 is an underneath perspective view of the bottom 1200 of a surfboard with a mount 1800 installed thereon the bottom 1200.
Figure 13:
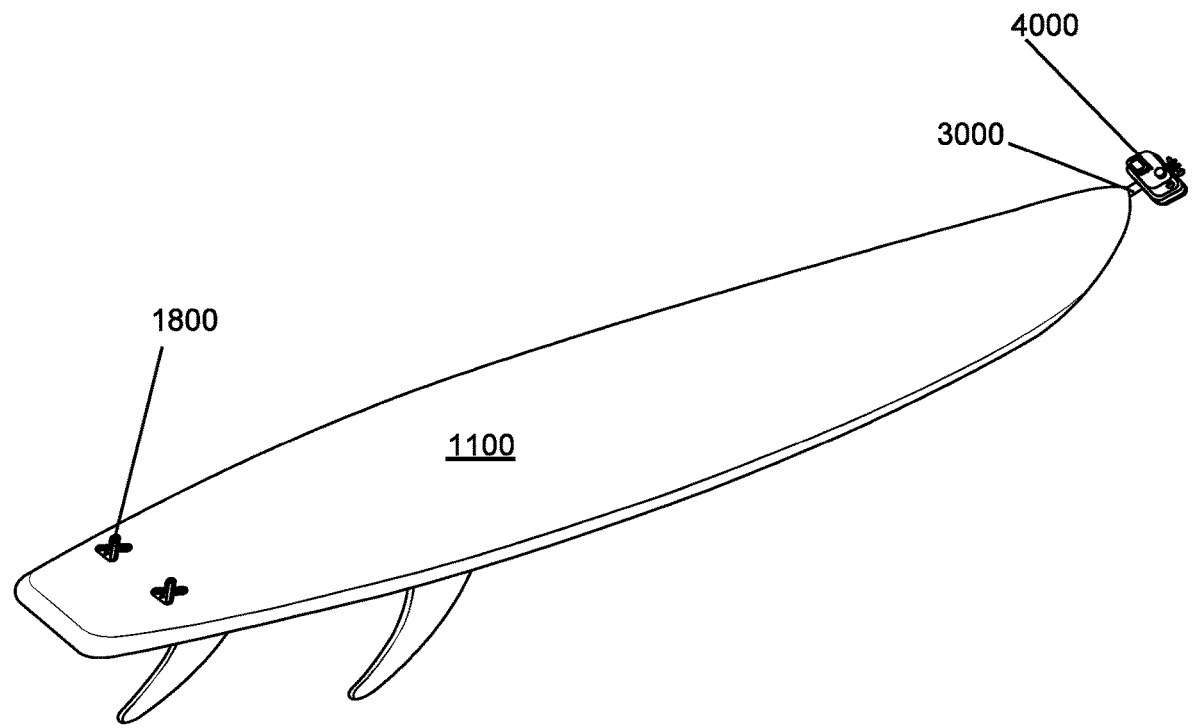
FIG. 13 is a perspective view of a camera 4000 mounted on a pole 300 and coupled to a mount 1800 (not shown; see FIG. 12)
Figure 16:
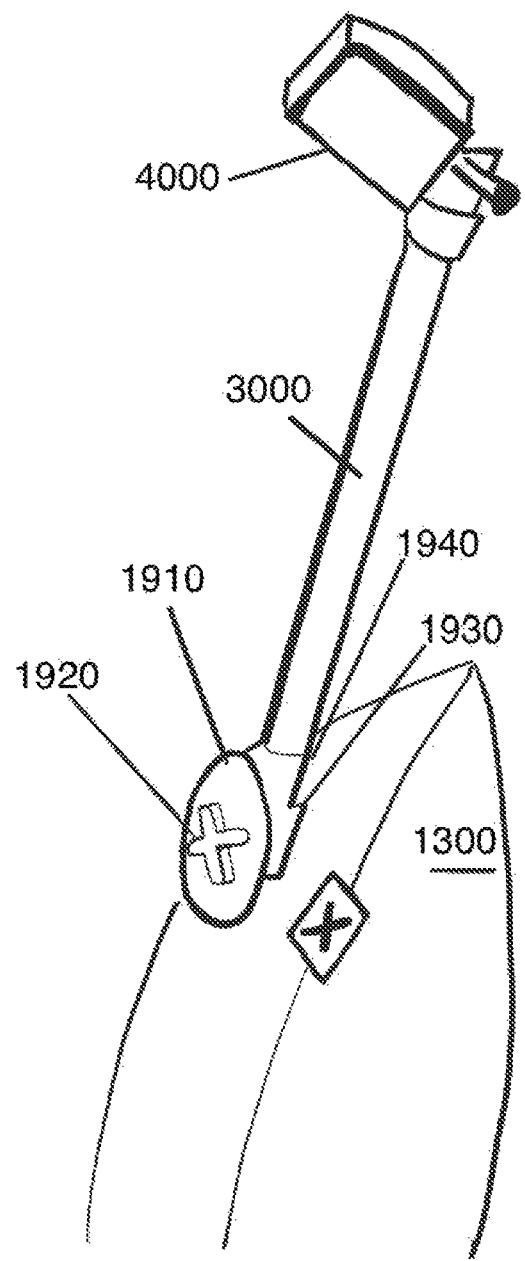
FIG. 16 is an underneath view of the surfboard 1000 with a mount 1800 disposed on the bottom 1200 front 1300 of the surfboard 1800, a mounting plate 1900 with mounting surface 1910 and plug 1920 for attaching a camera 400 on the end of a pole 3000 to the surfboard.
Figure 17:
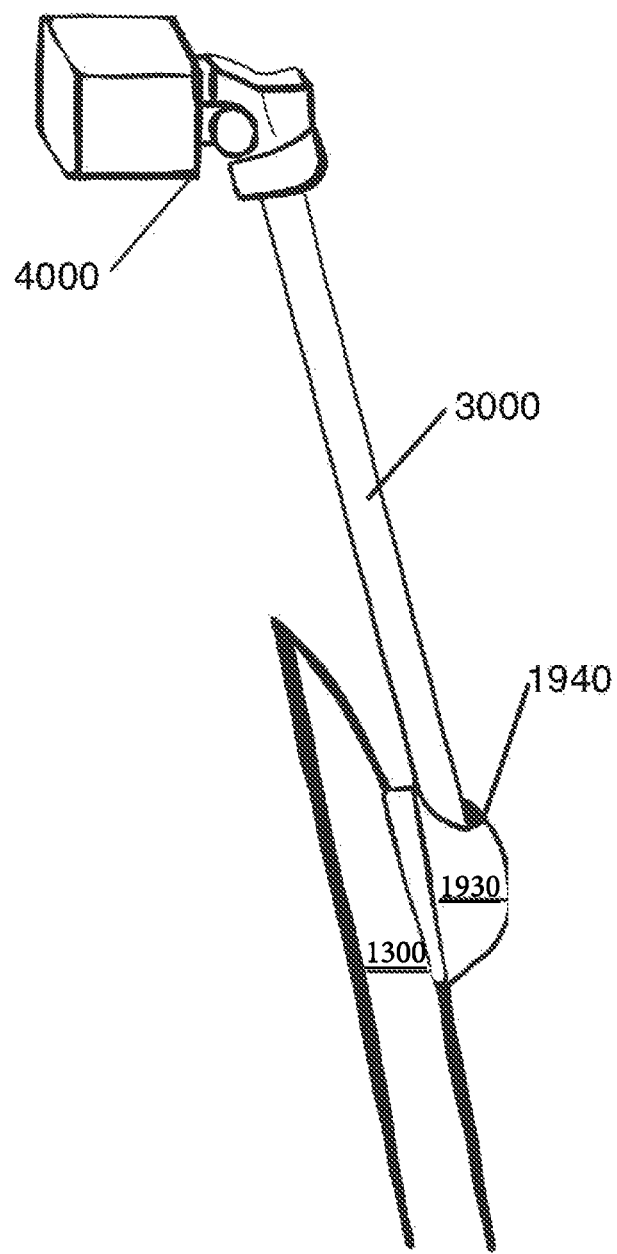
FIG. 17 is a side view of FIG. 16 with the mounting plate 1900 installed on the surfboard.

FIG. 12 is an underneath perspective view of the bottom 1200 of a surfboard with a mount 1800 installed thereon the bottom 1200. FIG. 13 is a perspective view of a camera 4000 mounted on a pole 300 and coupled to a mount 1800 (not shown; see FIG. 12). FIG. 16 is an underneath view of the surfboard 1000 with a mount 1800 disposed on the bottom 1200 front 1300 of the surfboard 1800, a mounting plate 1900 with mounting surface 1910 and plug 1920 for attaching a camera 400 on the end of a pole 3000 to the surfboard. FIG. 17 is a side view of FIG. 16 with the mounting plate 1900 installed on the surfboard.

Figure 18:
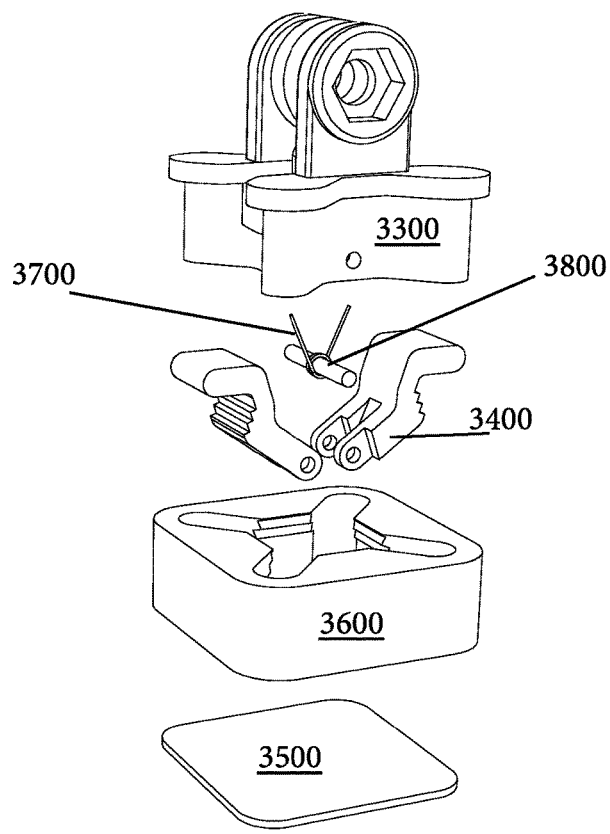
FIG. 18 is a perspective exploded view of the camera mount 3300.
Figure 19:
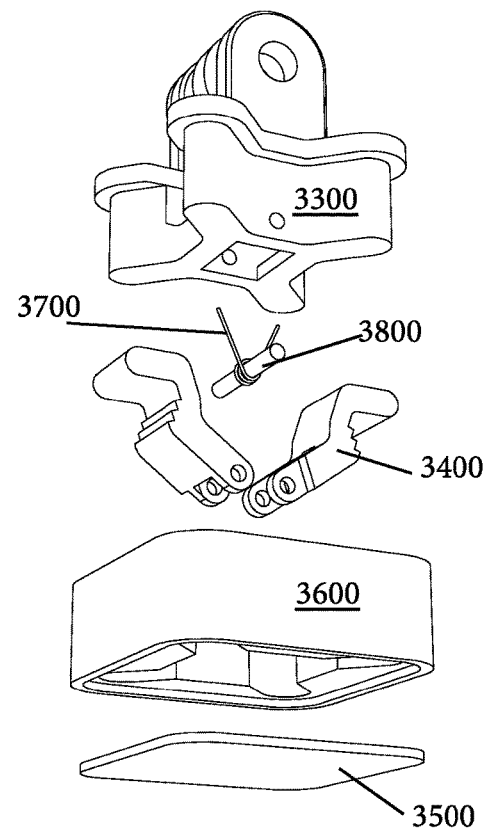
FIG. 19 is an exploded view of the camera mount 3300 from an upward angle perspective.
Figure 20:
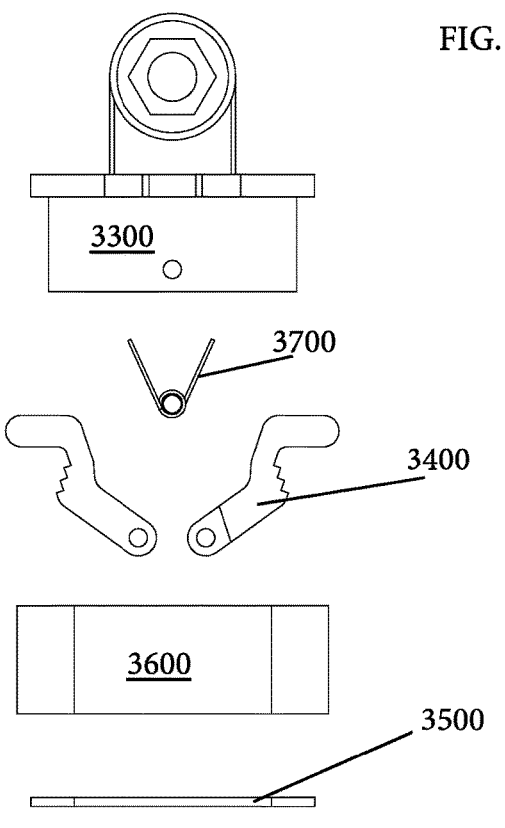
FIG. 20 is an exploded view of the camera mount 3300 from the front.

FIG. 18 is a perspective exploded view of another embodiment of a camera mount 3300 and receiver 3600 assembly. FIG. 19 is an exploded view of the camera mount 3300 and receiver 3600 assembly from an upward angle perspective. FIG. 20 is an exploded view of the camera mount 3300 and receiver assembly 3600 from a front view. As shown in these three figures, the assembly suitably comprises the mount 3300 with mounting clamps 3400 and spring clip 3700, mounting rod 3800, the mounting base or receiver 3600 with a bottom surface 3500.

Figure 21A:
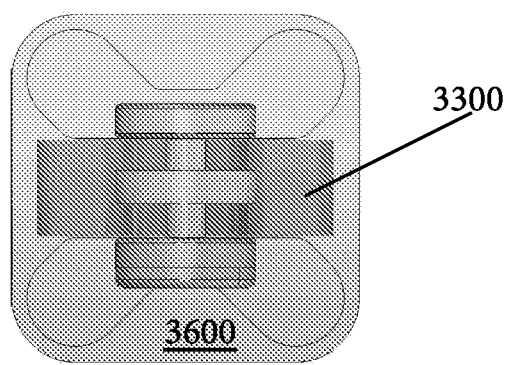
FIG. 21A is an orthogonal view of the camera mount 3300 in the mounting base 3600 from the top.
Figure 21B:
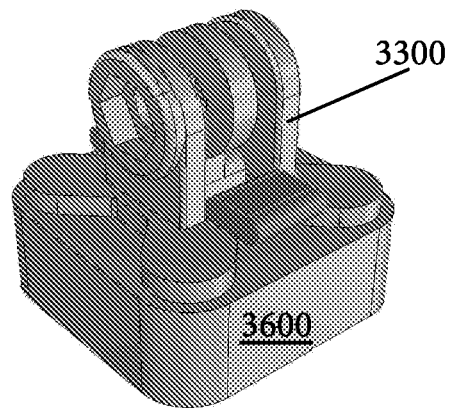
FIG. 21B is a perspective view of the camera mount 3300 in the mounting base 3600.
Figure 21C:
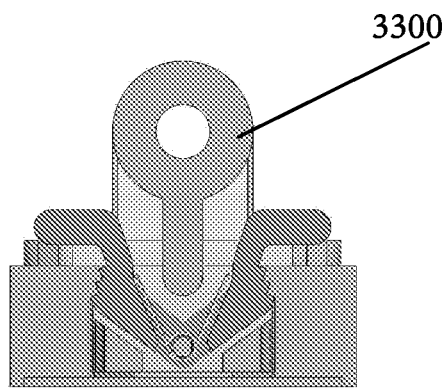
FIG. 21C is an orthogonal view of the camera mount 3300 in the mounting base 3600 from the front.
Figure 21D:
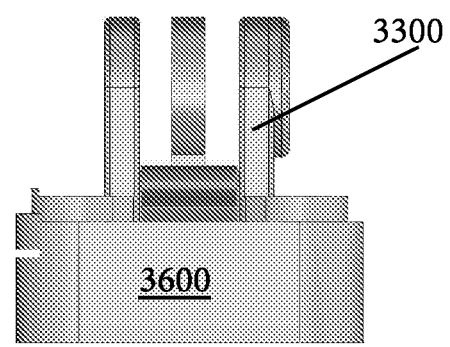
FIG. 21D is an orthogonal view of the camera mount 3300 in the mounting base 3600 from the side.

FIG. 21A is an orthogonal top view of the camera mount 3300 in the mounting base 3600 in an assembled configuration with the mount 3000 installed in the base or receiver 3600. FIG. 21B is a perspective view of the camera mount 3300 in the mounting base 3600. FIG. 21C is a cross-section of the camera mount 3300 in the mounting base 3600. FIG. 21D is an orthogonal view of the camera mount 3300 in the mounting base 3600 from the side. As shown, the receiver 3600 is adapted to receive the bottom surface on the underside via clip-in action and receive the mount 3400 on the top side via insertion. As discussed later below, the receiver 3600 may be adhered into a cutout in a surfboard or other surface as described above.

Figure 22:
FIG. 22 is an orthogonal view of the mounting clamp 3400 from the top.
Figure 23:
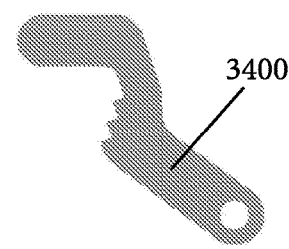
FIG. 23 is an orthogonal view of the mounting clamp 3400 from the side.
Figure 24:
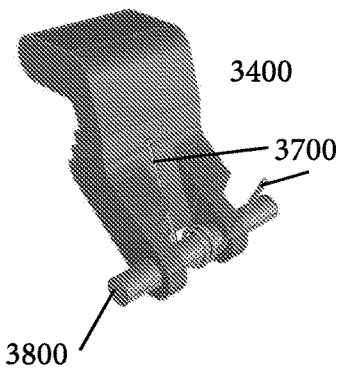
FIG. 24 is a perspective view of the mounting clamp 3400 with the connecting rod 3800 and spring clip 3700 attached.
Figure 25:
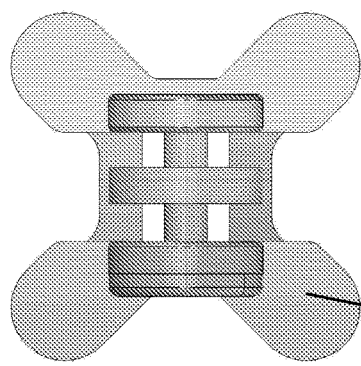
FIG. 25 is an orthogonal view of the camera mount 3300 from the top.
Figure 26:
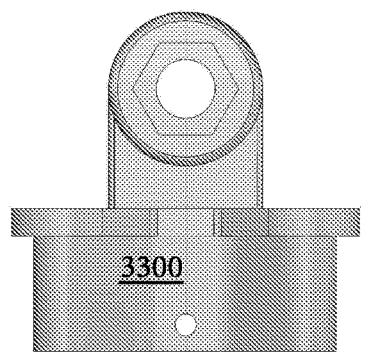
FIG. 26 is an orthogonal view of the camera mount 3300 from the side.
Figure 27:
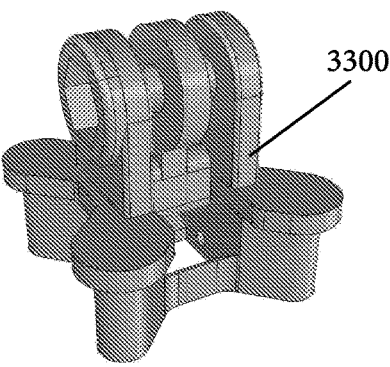
FIG. 27 is a perspective view of the camera mount 3300.

FIG. 25 is an orthogonal view of the camera mount 3300 from the top. FIG. 26 is an orthogonal view of the camera mount 3300 from the side. FIG. 27 is a perspective view of the camera mount 3300. As shown, the mount may be configured to connect to a camera via three or more couplings. On the other end, the mount 3300 may be configured to couple with the receiver 3600 (not shown) via a digited footprint as discussed above. As discussed in greater detail below, the mount 3300 may be configured with mounting clamps 3400 with teeth that interact with corresponding teeth in the receiver 3600. Suitably, the mounting camps are secured to the mount 3300 via a rod 3800 and spring clip 370 mechanism, which can be viewed in FIGS. 22 through 24.

Figure 28A:
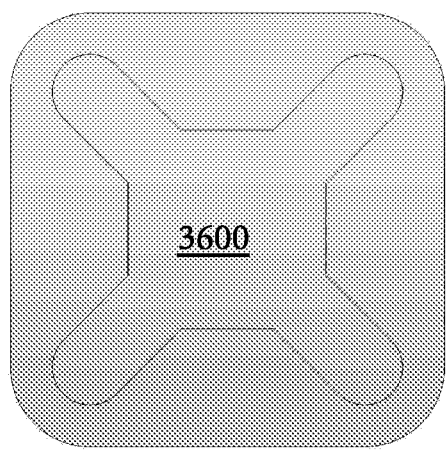
FIG. 28A is an orthogonal view of the mounting base 3600 from the top.
Figure 28B:
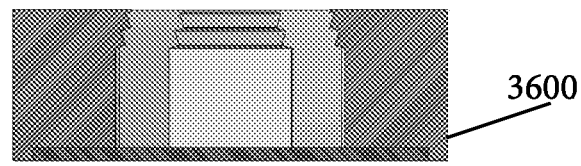
FIG. 28B is a cross section view of the mounting base 3600
Figure 28C:
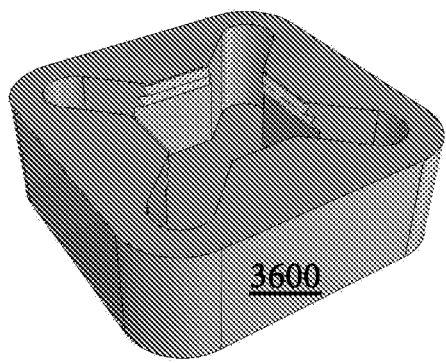
FIG. 28C is a perspective view of the mounting base 3600.

18 through 21D and 25 through 27 show the camera mount. FIG. 18 is an exploded view of the camera mount 3300. The camera mount 3300 is secured to the mounting base 3600 via the spring clip, the connecting rod 3800, and mounting clamps 3400. As shown in FIGS. 28A-C, the mounting base 3600 exhibits an indenture or receptacle or socket that may be any shape, preferably a digited shape, like an X or ½ X, Y, K, T, Q, A, V, Z, *, +, <, >, in which the camera mount features a plug with correspondingly digited footprint that may be inserted and secured to the socket of the base or receiver 3600.

FIGS. 18 through 20 and FIG. 24 show the spring clip 3700. The spring clip 3700 encompasses the connecting rod 3800 and applies pressure to the mounting clamps 3400 which in turn apply pressure to the mounting base 3600 thereby securing the camera mount 3300 in the mounting base 3600. The connecting rod 3800, shown in FIGS. 18, 19 and 24 connect the mounting clamps 3400 to the mounting base 3600. The connecting rod 3800 achieve this connection through insertion into circular openings of the mounting clamps 3400. This encompassing connection allows for rotational movement of the mounting clamps 3400 permitting the insertion, via pinching movement, and securement of the mounting clamps 3400 to the mounting base 3600.

FIGS. 18 through 20, 21C through 24, and 28A through 28C show the mounting clamp 3400 of the mount 3300 and the receiver or base 3600. The mounting clamp 3400 is structurally similar to a hook latch with ridges on the hook portion of the mounting clamp 3400 to facilitate a secure grip between the mounting clamp 3400 and the mounting base 3600. Specifically, the base features teeth that cooperate with the teeth of the mounting clamp 3400 to secure the mount 3300 in the digited receptacle of the base or receiver 3600. Suitably, the teeth can be released from cooperation via rotation of the clamps 3400 around the mounting rod 3800. Suitably, the spring clip 3700 operates to bias the clamps towards a closed position.

Figure 29:
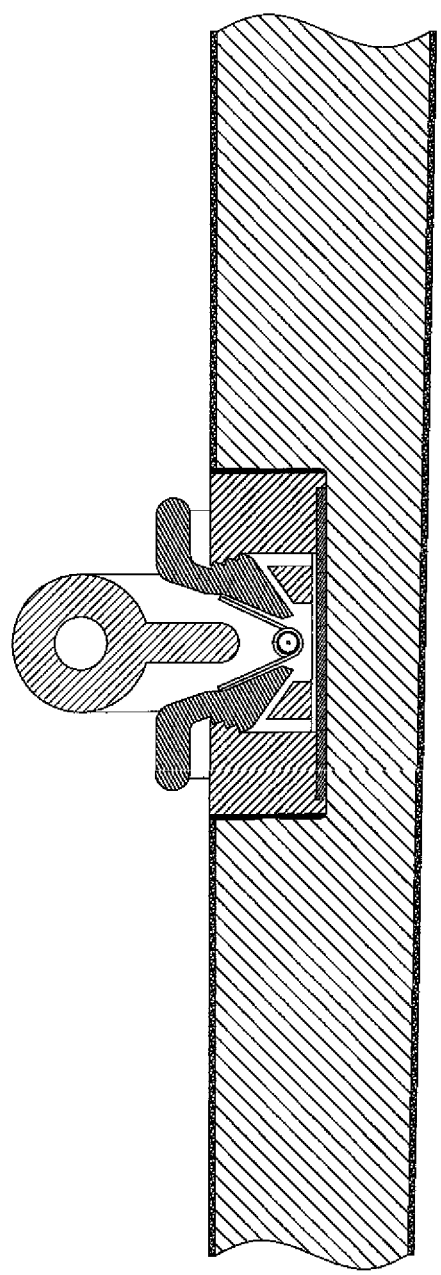
FIG. 29 is a cross section of the mounting mount 3300 in the mounting base 3600 in a surfboard.

FIG. 29 is a cross section of the camera mount 3300 installed in the mounting receiver or base 3600 that has been further installed in a cutout of a surfboard. As shown, the receiver 3600 may be provided with the bottom surface 3500, that may be clipped into the receiver 3600 to provide additional surface area for the adhesive to grip the receiver 3600 and therefore provide a sturdy coupling of the receiver and board within the cutout. Suitably, the receiver 3600 and mount 3300 may be generally operated as disclosed above in connection with FIGS. 1 through 17.

Figure 30A:
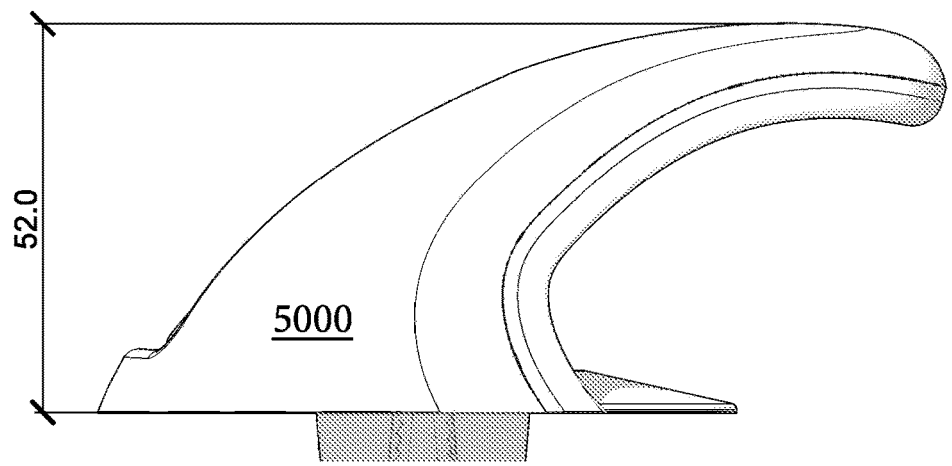
FIG. 30A is a side view of the foot hold 5000 showing.
Figure 30B:
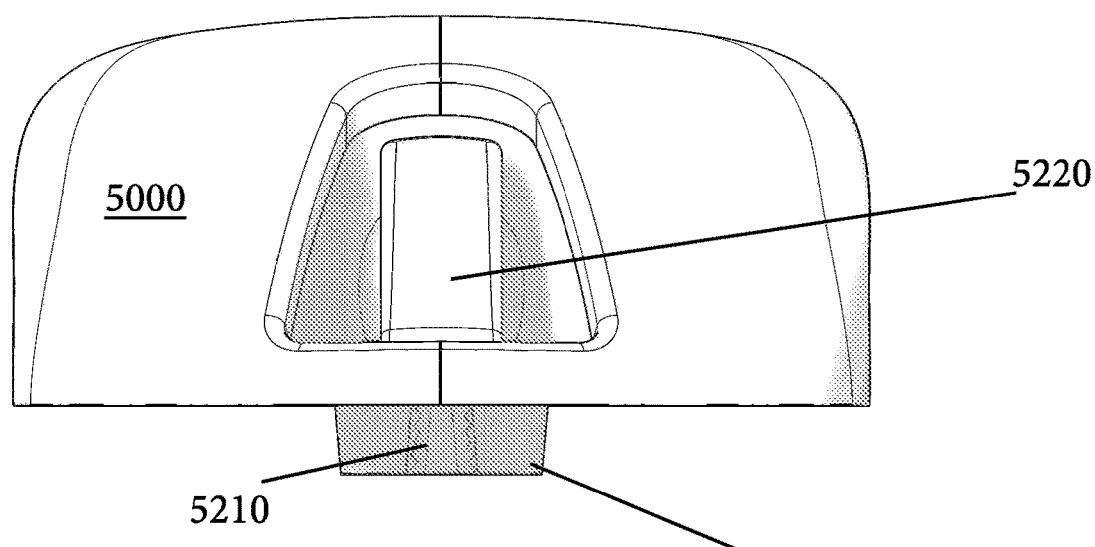
FIG. 30B is a front view of the foot hold 5000.
Figure 30C:
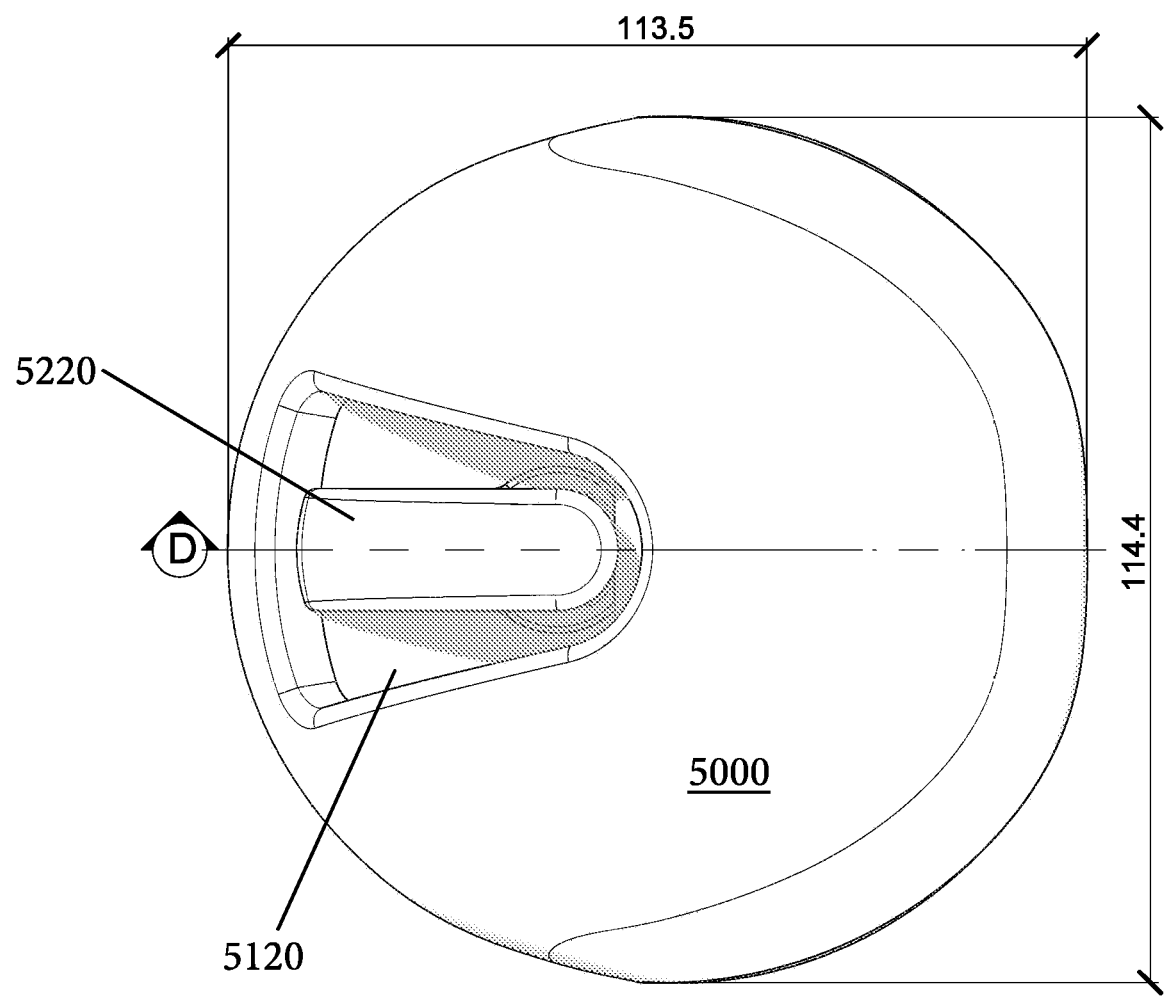
FIG. 30C is a top view of the foot hold 5000.
Figure 30D:
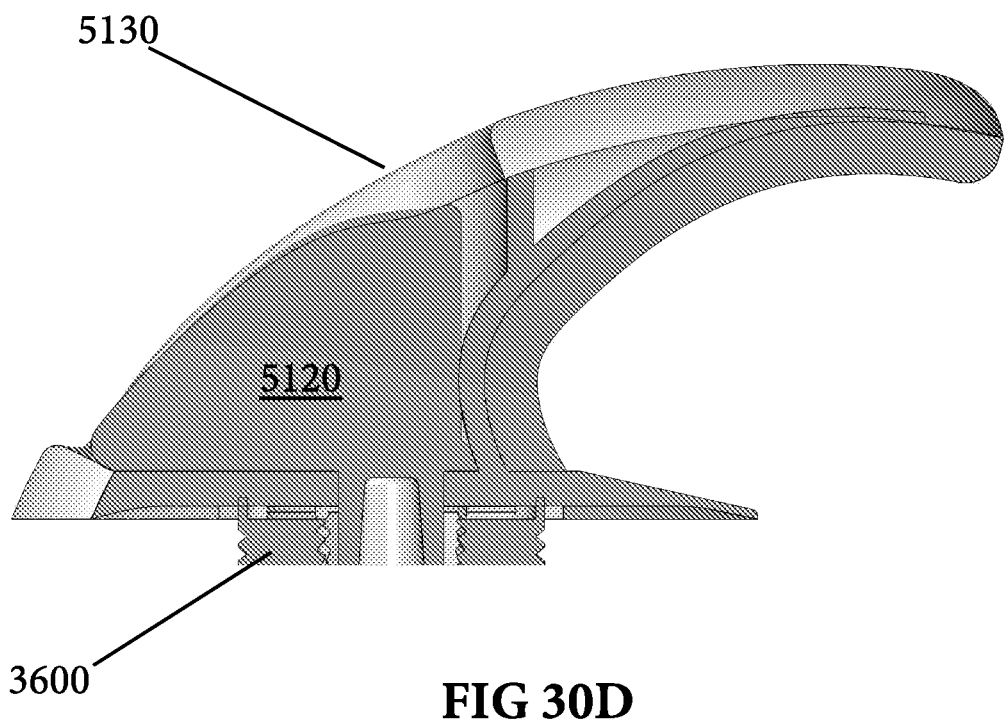
FIG. 30D is a cross-section view of the foot hold 5000.
Figure 30E:
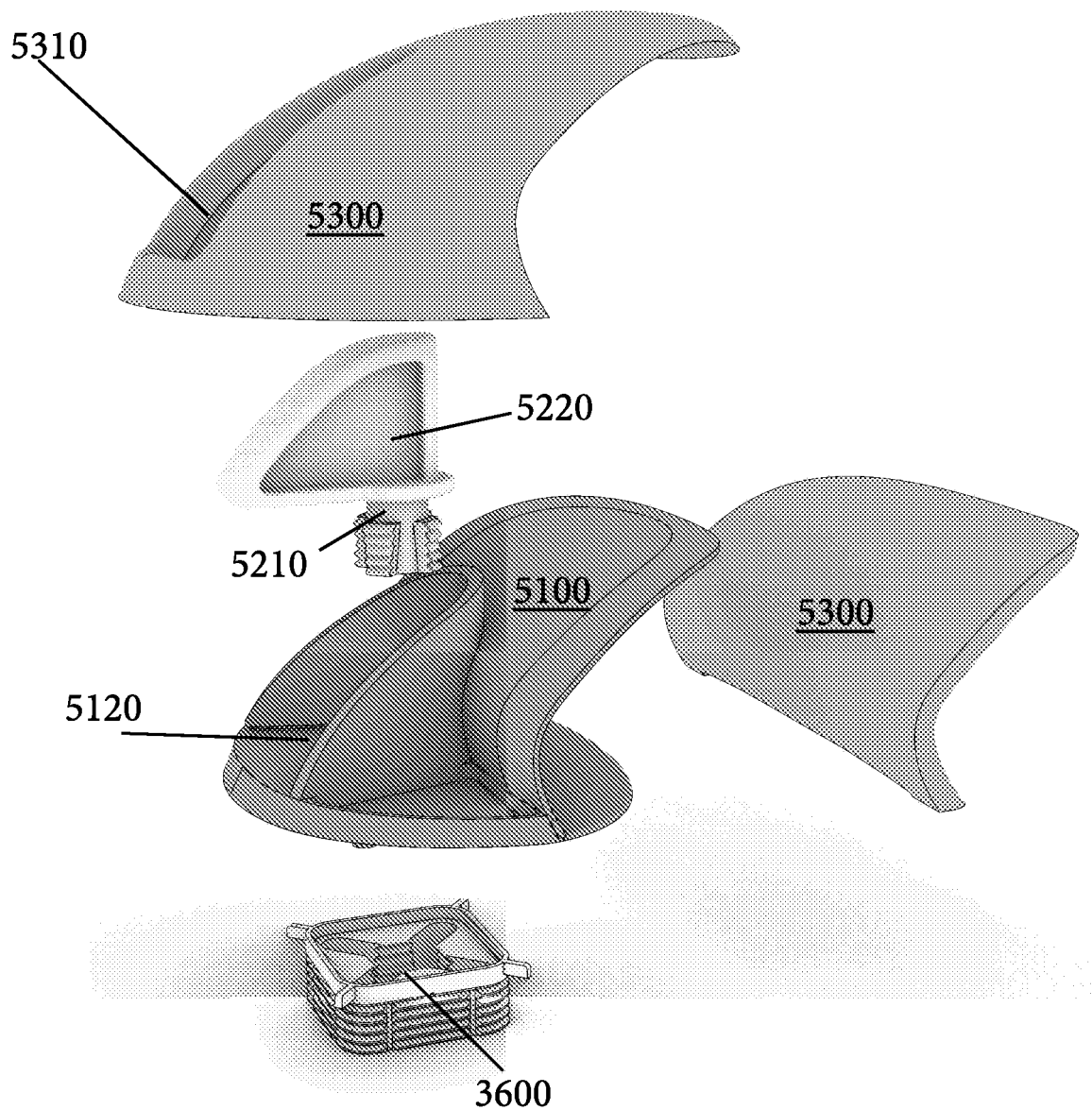
FIG. 30E is an exploded view of the foot hold 5000.

FIGS. 30A through 30G show the foot hold 5000. As shown in FIG. 30E, the foot hold 5000 may be installed to a surface via the mounting base 3600 by insertion of the foot hold flag piece 5220 and foot hold securing piece 5210 through the foot hold structure 5100. Specifically, as shown in FIG. 30D, the foot hold securing piece 5210 passes through an opening of the foot hold structure, the securement opening 5110, and is locked into the mounting base 3600 via a twisting of the foot hold flag piece 5220, resulting in an alignment of the teeth of the foot hold securing piece with the teeth of the mounting base 3600 which, in turn, fixates the foot hold structure 5100 to the surface.

FIGS. 32A through 32D show the foot hold securing piece 5210 and foot hold flag piece 5220. The foot hold flag piece 5220 projects superiorly from the foot hold securing piece 5210 and acts as a handle for a use to twist or rotate the foot hold flag piece 5220 and attached foot hold securing piece 5210, resulting in an alignment of teeth between the foot hold securing piece 5120 and the mounting base 3600 locking in the foot hold securing piece 5210 and foot hold structure 5100 through which the foot hold securing piece 5210 has been inserted. In a typical embodiment, the foot hold flag piece 5220 exhibits a rounded triangular shape, however, the foot hold flag piece 5220 may exhibit a variety of shapes that permit a user to grip and rotate the piece.

FIGS. 31A through 31E show the foot hold structure 5100. The foot hold structure 5100 exhibits a securement opening 5110, a securing piece alley 5120, and a foot hold platform 5130. As shown, the securing piece alley 5120 forms an opening in the foot hold platform 5130 through which the foot hold securing piece 5210 and foot hold flag piece 5220 may be inserted. Specifically, the foot hold anchors 5200 are inserted into the mounting base 3600, allowing the foot hold securing piece 5210 to be inserted through the securement opening 5110 and into the mounting base 3600. The securing piece alley 5120 allots a space in which the foot hold flag piece 5220 may protrude and be twisted or rotated by a user to align the teeth of the inferiorly attached foot hold securing piece 5210 and the teeth of the mounting base 3600 to lock in and secure the foot hold structure 5100 to the surface.

Figure 30F:
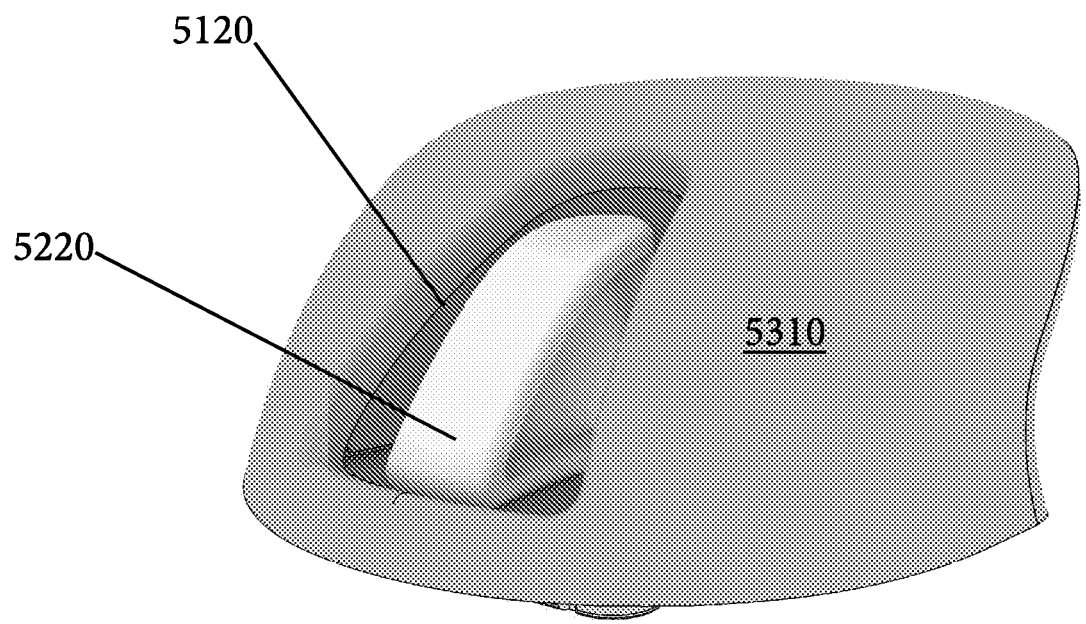
FIG. 30F is a perspective view of the foot hold 5000.
Figure 30G:
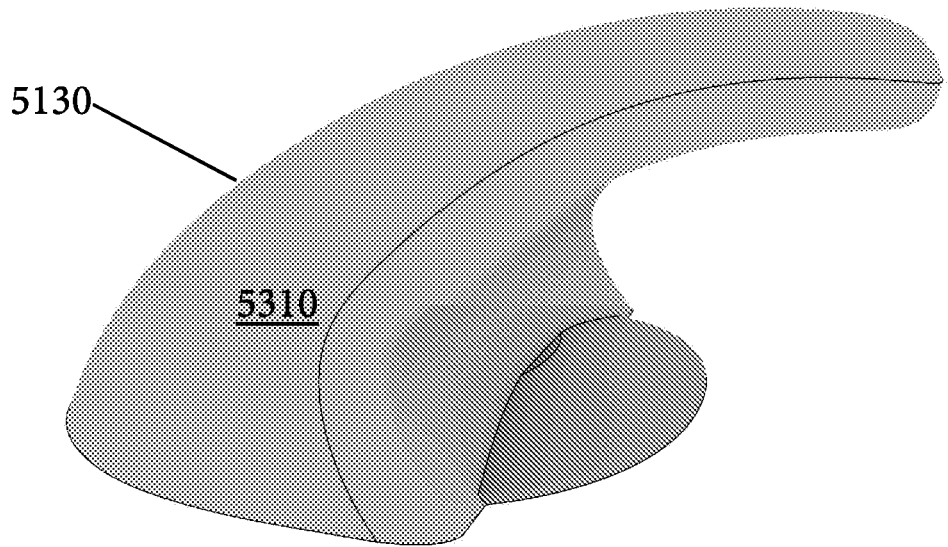
FIG. 30G is a side view of the foot hold 5000 from an upward angle perspective.
Figure 31A:
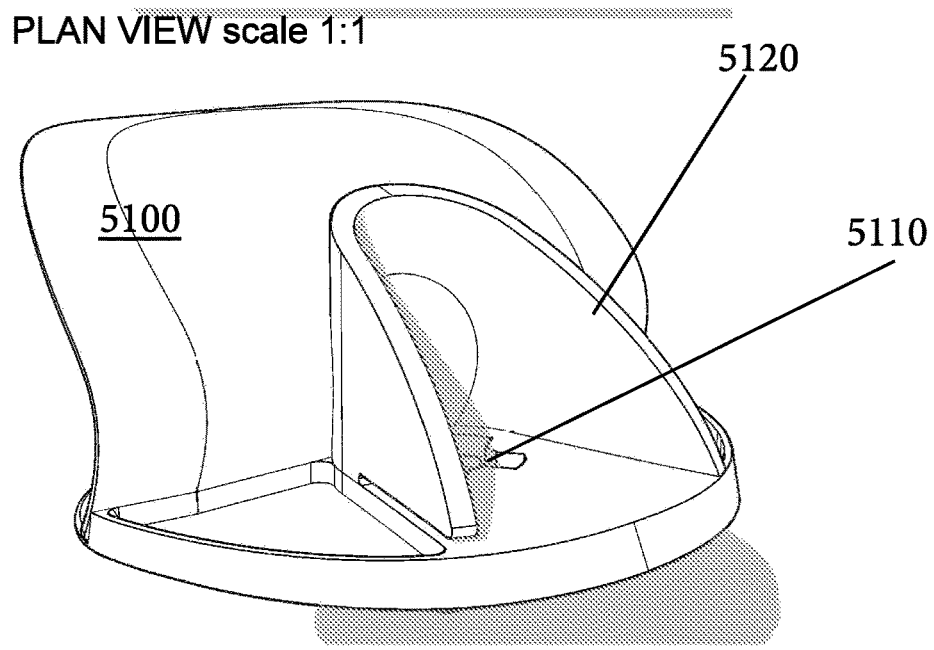
FIG. 31A is an perspective view of the foot hold structure 5100.
Figure 31B:
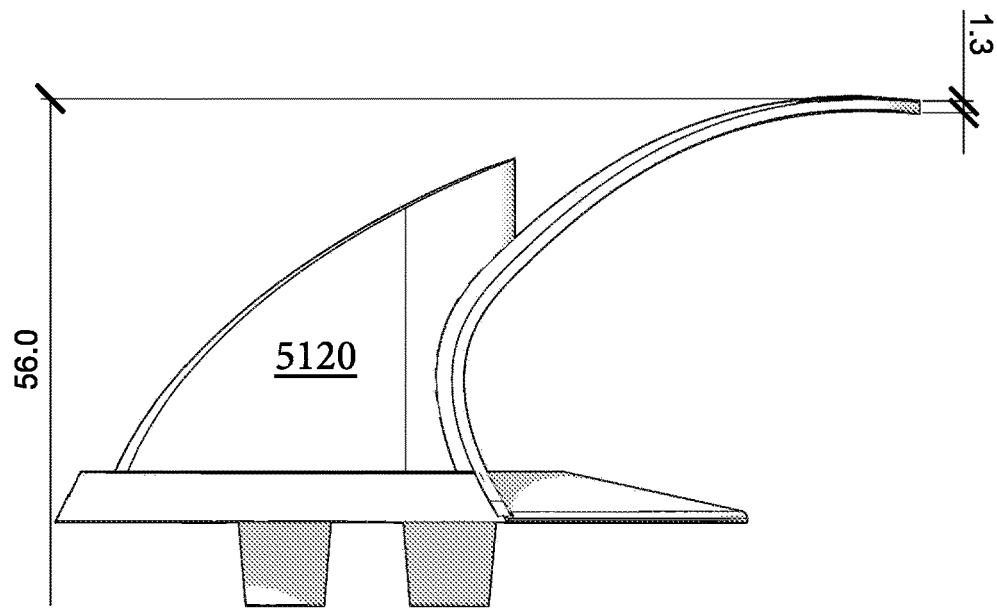
FIG. 31B is a side view of the foot hold structure 5100.
Figure 31C:
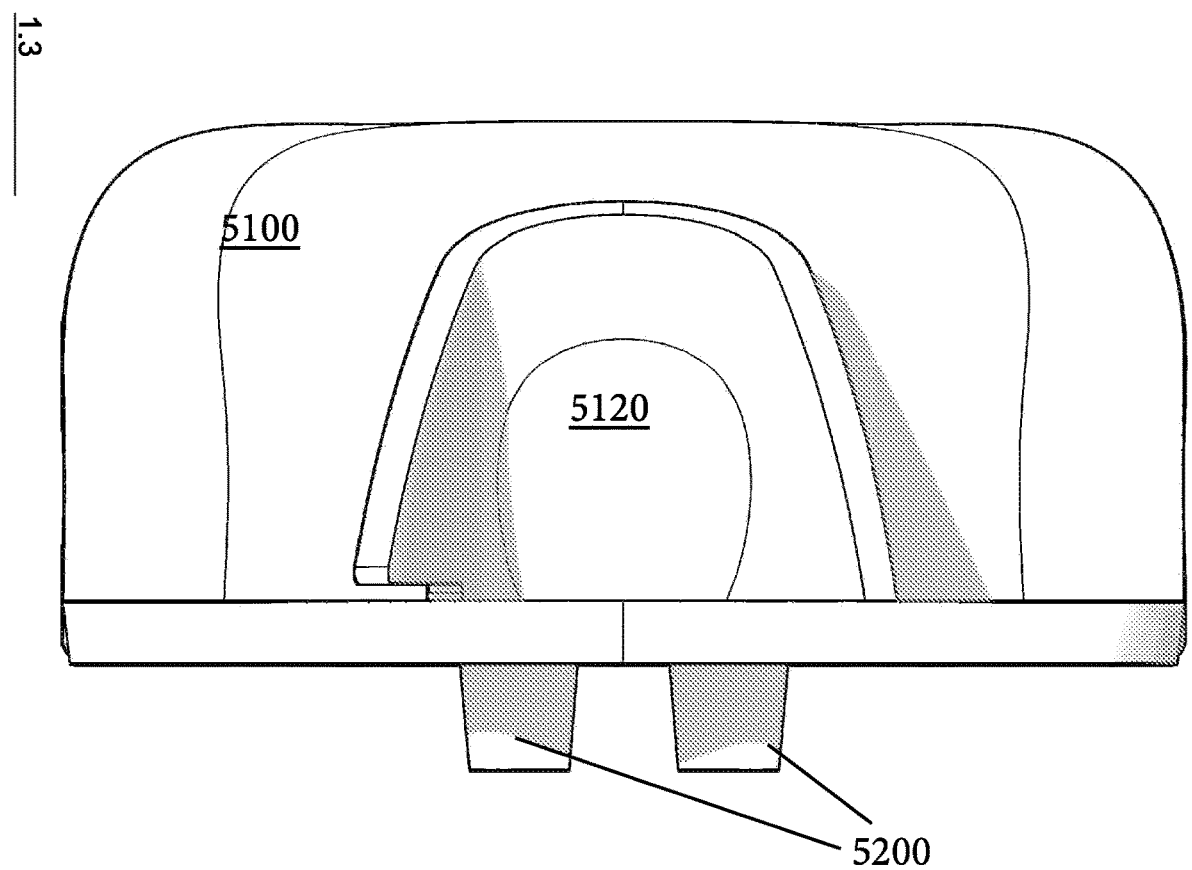
FIG. 31C is a front view of the foot hold structure 5100.
Figure 31D:
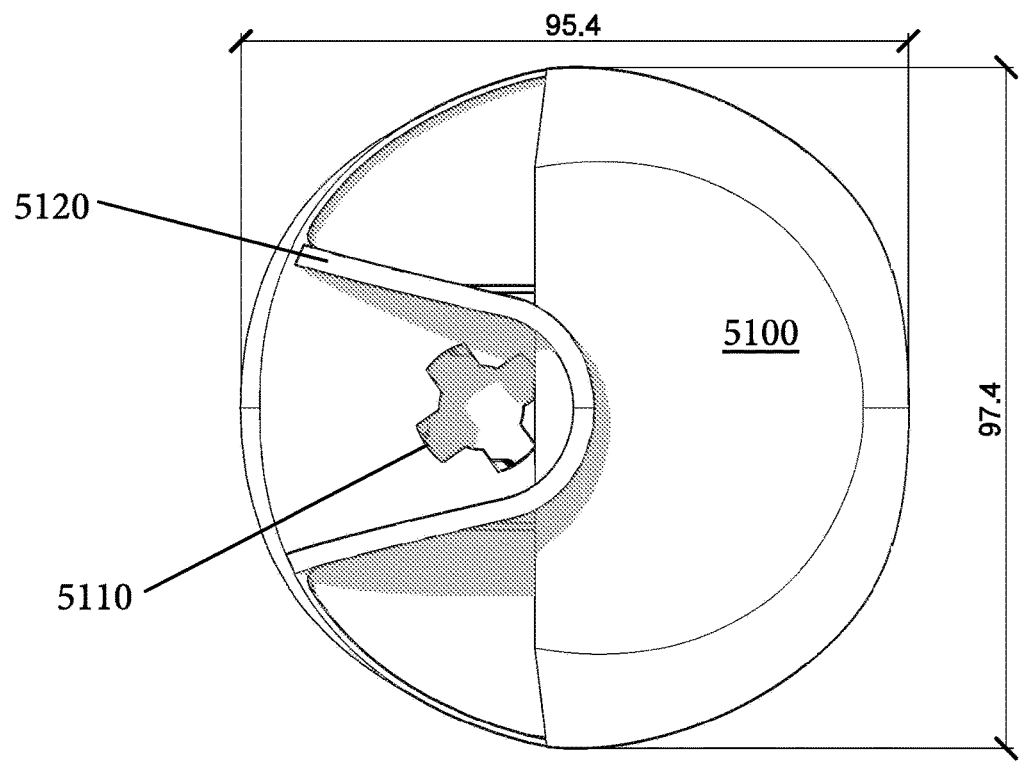
FIG. 31D is a top view of the food hold structure 5100.
Figure 31E:
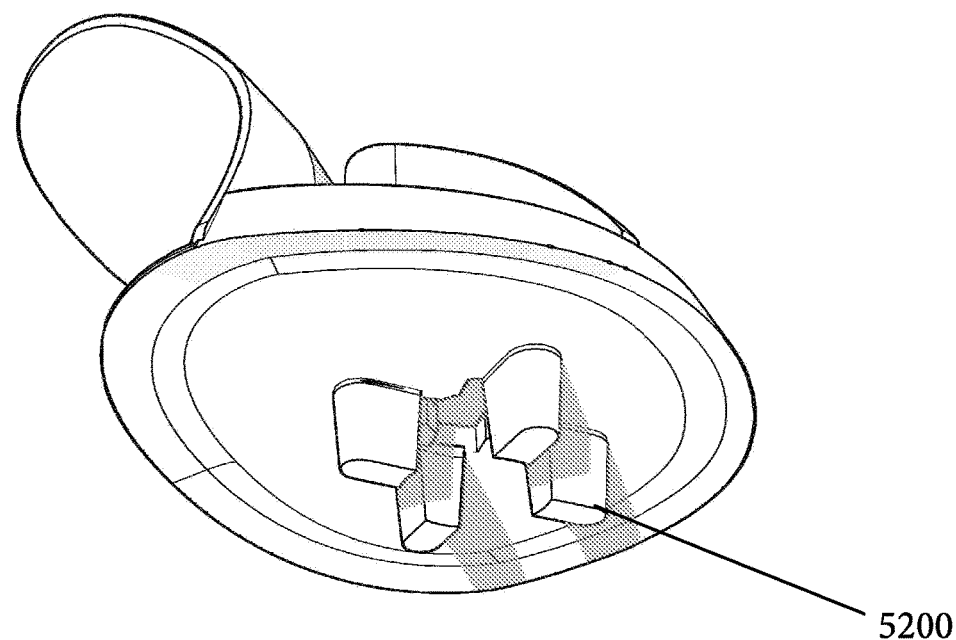
FIG. 31E is a bottom view from an upward angle of the foot hold structure 5100.
Figure 32A:
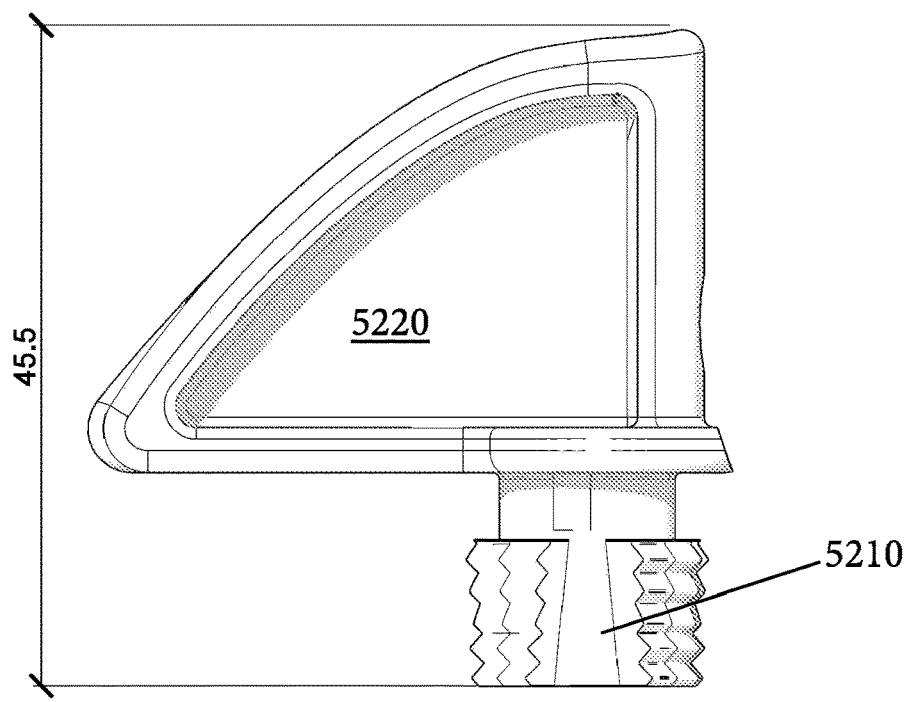
FIG. 32A is a side view of the foot hold securing piece 5200.
Figure 32B:
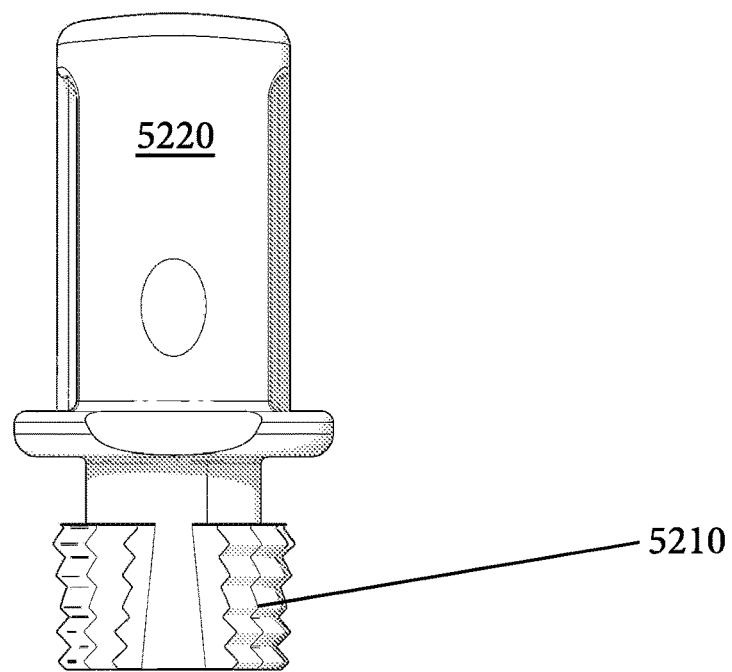
FIG. 32B is a back view of the foot hold securing piece 5200.
Figure 32C:
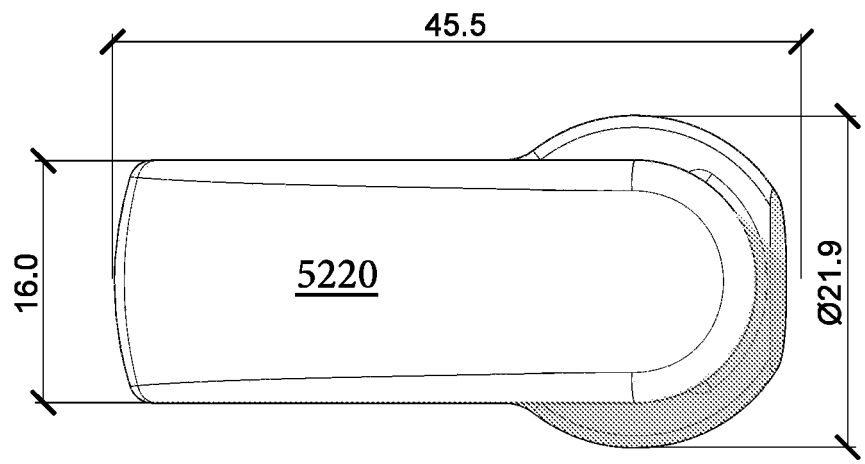
FIG. 32C is a top view of the foot hold securing piece 5200.
Figure 32D:
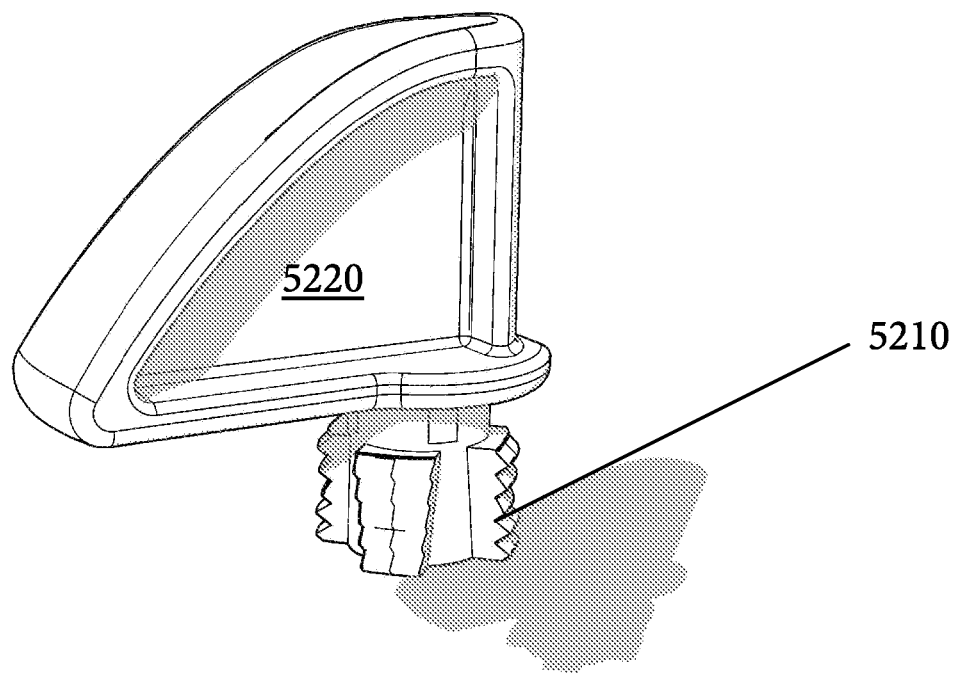
FIG. 32D is perspective view of the foot hold securing piece 5200

FIGS. 30F and 30G show the foot hold hood 5300. In one embodiment, the foot hold 5300 is a friction material permitting enhanced gripping by a foot to facilitate directional manipulation of the board through to foot movement. The foot hold hood 5300 exhibits a hood opening 5310 that outlines the securing piece alley 5120 and permits access to the foot hold securing piece 5210. Through the hood opening 5310, the foot hold securing piece 5210 may be twisted to release and remove the foot hold 5000 from the mounting base 3600.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

I claim:

1. A foot hold assembly comprising:
   a foot hold structure with a securing piece alley;
   a foot hold anchor defined by a foot hold flag piece and a foot hold securing piece with a first at least one set of teeth, wherein the securing piece is provided through the securing piece alley so that a the foot hold flag piece is exposed at one side of the securing piece alley and wherein said first at least one set of teeth are exposed at another side of the securing piece alley, wherein said first at least one set of teeth are rotatable relative to the foot hold structure by rotating said foot hold securing piece within the securing piece ally whenever the foot hold flag piece is rotated relative to the foot hold structure;
   a receiver with a digited receptacle that is configured to receive the at least one set of teeth, wherein the digited receptacle features a second at least one set of teeth that are configured to interface with the first at least one set of teeth when said foot hold flag piece is rotated relative to said foot hold structure to a first position, and wherein said second at least one set of teeth are configured to avoid said first at least one set of teeth when said foot hold flag piece is rotated relative to the foot hold structure to a second position;
   wherein the receiver is installed in a surfboard so that the digited receptacle is flush with a surface of the surf board.

2. The foot hold assembly of claim 1 further comprising a foot hold hood with a hood opening to access said foot hold flag piece.

3. The camera mount assembly of claim 1 further comprising a spring for biasing the foot hold flag piece to said first position.

4. The foot hold assembly of claim 2 further comprising a foot hold pad.

5. A method of installing a foot hold assembly on a surfboard comprising the steps of:
   a. routing a cut-out in a surface of the surfboard;
   b. installing a receiver in the cutout, where the receiver has a footprint that matches the cutout;
   c. ensuring the receiver has a receptacle that is flush with the surface of the surfboard;
   d. installing a plug of the foot hold in the receptacle, where the plug has a footprint that matches the receptacle; and,
   e. rotating a foot hold flag piece to lock the plug into the receptacle.

6. A surfboard foot hold that removably attached to receiver with a digited footprint in a surface of a surfboard.

* * * * *